United States Patent
Srinivasan et al.

(10) Patent No.: US 11,995,546 B1
(45) Date of Patent: *May 28, 2024

(54) ENSEMBLE NEURAL NETWORK STATE MACHINE FOR DETECTING DISTRACTIONS

(71) Applicant: Samsara Inc., San Francisco, CA (US)

(72) Inventors: Sharan Srinivasan, Sunnyvale, CA (US); Brian Tuan, Cupertino, CA (US); John Bicket, Burlingame, CA (US); Jing Wang, Toronto (CA); Muhammad Ali Akhtar, Chicago, IL (US); Abner Ayala Acevedo, Orlando, FL (US); Bruce Kellerman, Atlanta, GA (US); Vincent Shieh, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 17/811,512

(22) Filed: Jul. 8, 2022

Related U.S. Application Data

(63) Continuation of application No. 17/454,799, filed on Nov. 12, 2021, now Pat. No. 11,386,325.

(51) Int. Cl.
*G06N 3/08* (2023.01)
*B60W 40/09* (2012.01)
(Continued)

(52) U.S. Cl.
CPC ............... *G06N 3/08* (2013.01); *B60W 40/09* (2013.01); *B60W 50/14* (2013.01); *G06N 7/01* (2023.01);
(Continued)

(58) Field of Classification Search
CPC ............ G06N 3/08; G06N 20/20; G06N 7/01; B60W 40/09; B60W 50/14;
(Continued)

(56) References Cited

U.S. PATENT DOCUMENTS

| | | | |
|---|---|---|---|
| 5,917,433 A | 6/1999 | Keillor et al. | |
| 6,393,133 B1 * | 5/2002 | Breed | B60N 2/2806 348/135 |

(Continued)

FOREIGN PATENT DOCUMENTS

| | | |
|---|---|---|
| CN | 108446600 A | 8/2018 |
| CN | 110766912 A | 2/2020 |
| KR | 102324978 B1 | 11/2021 |

OTHER PUBLICATIONS

U.S. Pat. No. 11,341,786, Dynamic Delivery of Vehicle Event Data, May 24, 2022.

(Continued)

*Primary Examiner* — Peter D Nolan
*Assistant Examiner* — Wae L Louie
(74) *Attorney, Agent, or Firm* — Knobbe, Martens, Olson & Bear LLP

(57) ABSTRACT

A vehicle device may execute one or more neural networks (and/or other artificial intelligence), based on input from one or more of the cameras and/or other sensors, to intelligently detect safety events in real-time. The one or more neural networks may be an ensemble neural network that includes neural networks for detecting a head and hand of a user, neural networks for detecting hand actions of the user, neural networks for detecting the head pose of the user, neural networks for predicting an occurrence of an event, and neural networks for predicting a start time and end time of the event. Further, the neural networks can be segmented into a modular neural network based on metadata. The segmentation of the neural network can define a thin layer of the modular neural network to enable independent tuning of the thin layer of the modular neural network.

20 Claims, 11 Drawing Sheets

(51) Int. Cl.
*B60W 50/14* (2020.01)
*G06N 7/01* (2023.01)
*G06N 20/20* (2019.01)

(52) U.S. Cl.
CPC ....... *G06N 20/20* (2019.01); *B60W 2420/403* (2013.01); *B60W 2420/54* (2013.01); *B60W 2540/223* (2020.02); *B60W 2540/225* (2020.02); *B60W 2540/229* (2020.02)

(58) Field of Classification Search
CPC ..... B60W 2540/225; B60W 2540/229; B60W 2540/223; B60W 2420/42; B60W 2420/54
See application file for complete search history.

(56) References Cited

U.S. PATENT DOCUMENTS

| | | |
|---|---|---|
| 6,452,487 B1 | 9/2002 | Krupinski |
| 8,633,672 B2 | 1/2014 | Jung et al. |
| 8,774,752 B1 | 7/2014 | Akcasu et al. |
| 9,024,744 B2 | 5/2015 | Klose et al. |
| 9,445,270 B1 | 9/2016 | Bicket et al. |
| 9,477,639 B2 | 10/2016 | Fischer et al. |
| 9,731,727 B2 | 8/2017 | Heim et al. |
| 9,911,290 B1 * | 3/2018 | Zalewski ............. G07G 1/0072 |
| 9,952,046 B1 | 4/2018 | Blacutt et al. |
| 10,033,706 B2 | 7/2018 | Bicket et al. |
| 10,085,149 B2 | 9/2018 | Bicket et al. |
| 10,102,495 B1 | 10/2018 | Zhang et al. |
| 10,173,486 B1 | 1/2019 | Lee et al. |
| 10,173,544 B2 | 1/2019 | Hendrix et al. |
| 10,196,071 B1 | 2/2019 | Rowson et al. |
| 10,206,107 B2 | 2/2019 | Bicket et al. |
| 10,255,528 B1 | 4/2019 | Nguyen |
| 10,390,227 B2 | 8/2019 | Bicket et al. |
| 10,489,222 B2 | 11/2019 | Sathyanarayana et al. |
| 10,503,990 B2 | 12/2019 | Gleeson-May et al. |
| 10,579,123 B2 | 3/2020 | Tuan et al. |
| 10,609,114 B1 | 3/2020 | Bicket et al. |
| 10,623,899 B2 | 4/2020 | Watkins et al. |
| 10,827,324 B1 | 11/2020 | Hajimiri et al. |
| 10,843,659 B1 | 11/2020 | Innocenzi et al. |
| 10,999,374 B2 | 5/2021 | ElHattab et al. |
| 11,046,205 B1 | 6/2021 | Govan et al. |
| 11,122,488 B1 | 9/2021 | Lloyd et al. |
| 11,126,910 B1 | 9/2021 | Akhtar et al. |
| 11,127,130 B1 | 9/2021 | Jain et al. |
| 11,128,130 B2 | 9/2021 | Jain et al. |
| 11,131,986 B1 | 9/2021 | Gal et al. |
| 11,132,853 B1 | 9/2021 | Akhtar et al. |
| 11,137,744 B1 | 10/2021 | Heddleston et al. |
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 11,341,786 B1 | 5/2022 | Calmer et al. |
| 11,349,901 B1 | 5/2022 | Duffield et al. |
| 11,352,013 B1 | 6/2022 | Srinivasan et al. |
| 11,352,014 B1 | 6/2022 | Srinivasan et al. |
| 11,356,605 B1 | 6/2022 | Shemet et al. |
| 11,356,909 B1 | 6/2022 | Lloyd |
| 11,365,980 B1 | 6/2022 | Akhtar et al. |
| 11,386,325 B1 | 7/2022 | Srinivasan et al. |
| 11,451,610 B1 | 9/2022 | Saunders et al. |
| 11,451,611 B1 | 9/2022 | Saunders et al. |
| 11,479,142 B1 | 10/2022 | Govan et al. |
| 11,522,857 B1 | 12/2022 | Symons et al. |
| 11,558,449 B1 | 1/2023 | Bicket et al. |
| 11,599,097 B1 | 3/2023 | Gal et al. |
| 11,606,736 B1 | 3/2023 | Lloyd et al. |
| 11,641,388 B1 | 5/2023 | Saunders et al. |
| 11,641,604 B1 | 5/2023 | Lloyd |
| 11,643,102 B1 | 5/2023 | Calmer et al. |
| 11,665,223 B1 | 5/2023 | Duffield et al. |
| 11,669,714 B1 | 6/2023 | Akhtar et al. |
| 11,671,478 B1 | 6/2023 | Saunders et al. |
| 11,675,042 B1 | 6/2023 | Lloyd et al. |
| 11,683,579 B1 | 6/2023 | Symons et al. |
| 11,688,211 B1 | 6/2023 | Calmer et al. |
| 11,694,317 B1 | 7/2023 | Jain et al. |
| 11,704,984 B1 | 7/2023 | ElHattab et al. |
| 11,720,087 B1 | 8/2023 | Heddleston et al. |
| 11,741,760 B1 | 8/2023 | Dubin et al. |
| 11,752,895 B1 | 9/2023 | Govan et al. |
| 11,756,351 B1 | 9/2023 | Akhtar et al. |
| 11,780,446 B1 | 10/2023 | Srinivasan et al. |
| 11,838,884 B1 | 12/2023 | Dergosits et al. |
| 11,855,801 B1 | 12/2023 | Stevenson et al. |
| 2002/0061758 A1 | 5/2002 | Zarlengo et al. |
| 2002/0093565 A1 | 7/2002 | Watkins |
| 2005/0286774 A1 | 12/2005 | Porikli |
| 2006/0167591 A1 | 7/2006 | McNally |
| 2007/0080816 A1 | 4/2007 | Haque et al. |
| 2008/0252412 A1 | 10/2008 | Larsson et al. |
| 2008/0319602 A1 | 12/2008 | McClellan et al. |
| 2009/0034801 A1 | 2/2009 | Hammoud |
| 2009/0240427 A1 | 9/2009 | Siereveld et al. |
| 2010/0049639 A1 | 2/2010 | Ferro et al. |
| 2010/0203901 A1 | 8/2010 | Dinoff et al. |
| 2011/0276265 A1 | 11/2011 | Husain |
| 2012/0076437 A1 | 3/2012 | King |
| 2012/0201277 A1 | 8/2012 | Tanner et al. |
| 2012/0235625 A1 | 9/2012 | Takehara |
| 2012/0303397 A1 | 11/2012 | Prosser |
| 2013/0073114 A1 | 3/2013 | Nemat-Nasser et al. |
| 2013/0162421 A1 | 6/2013 | Inaguma et al. |
| 2013/0212130 A1 | 8/2013 | Rahnama |
| 2013/0244210 A1 | 9/2013 | Nath et al. |
| 2014/0012492 A1 | 1/2014 | Bowers et al. |
| 2014/0095061 A1 | 4/2014 | Hyde |
| 2014/0098060 A1 | 4/2014 | McQuade et al. |
| 2014/0193781 A1 | 7/2014 | Sands |
| 2014/0195106 A1 | 7/2014 | McQuade et al. |
| 2014/0195477 A1 | 7/2014 | Graumann et al. |
| 2014/0278108 A1 | 9/2014 | Kerrigan et al. |
| 2014/0324281 A1 | 10/2014 | Nemat-Nasser et al. |
| 2014/0354227 A1 | 12/2014 | Tyagi et al. |
| 2014/0354228 A1 | 12/2014 | Williams et al. |
| 2014/0376876 A1 | 12/2014 | Bentley et al. |
| 2015/0024705 A1 | 1/2015 | Rashidi |
| 2015/0035665 A1 | 2/2015 | Plante et al. |
| 2015/0044641 A1 | 2/2015 | Chauncey et al. |
| 2015/0074091 A1 | 3/2015 | Walkin et al. |
| 2015/0084757 A1 | 3/2015 | Annibale et al. |
| 2015/0116114 A1 | 4/2015 | Boyles |
| 2015/0226563 A1 | 8/2015 | Cox et al. |
| 2015/0283912 A1 | 10/2015 | Shimizu et al. |
| 2016/0034770 A1 | 2/2016 | Peterson et al. |
| 2016/0046298 A1 | 2/2016 | DeRuyck et al. |
| 2016/0267335 A1 | 9/2016 | Hampiholi |
| 2016/0275376 A1 | 9/2016 | Kant |
| 2016/0288744 A1 | 10/2016 | Rutherford et al. |
| 2016/0343091 A1 | 11/2016 | Han et al. |
| 2016/0375780 A1 | 12/2016 | Penilla et al. |
| 2017/0039784 A1 | 2/2017 | Gelbart et al. |
| 2017/0053555 A1 | 2/2017 | Angel et al. |
| 2017/0055868 A1 | 3/2017 | Hatakeyama |
| 2017/0061222 A1 | 3/2017 | Hoye et al. |
| 2017/0088142 A1 | 3/2017 | Hunt et al. |
| 2017/0102463 A1 | 4/2017 | Hwang |
| 2017/0113664 A1 | 4/2017 | Nix |
| 2017/0140603 A1 | 5/2017 | Ricci |
| 2017/0200061 A1 | 7/2017 | Julian et al. |
| 2017/0217444 A1 | 8/2017 | Chaston et al. |
| 2017/0263049 A1 | 9/2017 | MacDonald et al. |
| 2017/0286838 A1 | 10/2017 | Cipriani et al. |
| 2017/0291611 A1 | 10/2017 | Innes et al. |
| 2017/0292848 A1 | 10/2017 | Nepomuceno et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0012196 A1 | 1/2018 | Ricci et al. |

(56) References Cited

U.S. PATENT DOCUMENTS

| | | |
|---|---|---|
| 2018/0025636 A1 | 1/2018 | Boykin et al. |
| 2018/0039862 A1 | 2/2018 | Hyatt et al. |
| 2018/0048850 A1 | 2/2018 | Bostick et al. |
| 2018/0063576 A1 | 3/2018 | Tillman et al. |
| 2018/0093672 A1 | 4/2018 | Terwilliger et al. |
| 2018/0126901 A1 | 5/2018 | Levkova et al. |
| 2018/0189913 A1 | 7/2018 | Knopp et al. |
| 2018/0232583 A1 | 8/2018 | Wang et al. |
| 2018/0259353 A1 | 9/2018 | Tsurumi et al. |
| 2018/0262724 A1 | 9/2018 | Ross |
| 2018/0276485 A1 | 9/2018 | Heck et al. |
| 2018/0288182 A1 | 10/2018 | Tong et al. |
| 2018/0365888 A1 | 12/2018 | Satzoda et al. |
| 2019/0003848 A1 | 1/2019 | Hoten et al. |
| 2019/0019068 A1 | 1/2019 | Zhu et al. |
| 2019/0023208 A1 | 1/2019 | Boston et al. |
| 2019/0050657 A1 | 2/2019 | Gleeson-May et al. |
| 2019/0118655 A1 | 4/2019 | Grimes et al. |
| 2019/0174158 A1 | 6/2019 | Herrick et al. |
| 2019/0244301 A1 | 8/2019 | Seth et al. |
| 2019/0286948 A1 | 9/2019 | Sathyanarayana et al. |
| 2019/0318419 A1 | 10/2019 | VanderZanden |
| 2019/0327590 A1 | 10/2019 | Kubo et al. |
| 2019/0327613 A1 | 10/2019 | Bicket et al. |
| 2019/0370577 A1 | 12/2019 | Meng et al. |
| 2020/0074397 A1 | 3/2020 | Burda et al. |
| 2020/0086879 A1 | 3/2020 | Lakshmi Narayanan et al. |
| 2020/0139847 A1 | 5/2020 | Baumer et al. |
| 2020/0150739 A1 | 5/2020 | Tuan et al. |
| 2020/0162489 A1 | 5/2020 | Bar-Nahum et al. |
| 2020/0192355 A1 | 6/2020 | Lu |
| 2020/0207358 A1* | 7/2020 | Katz .................. G02B 27/0093 |
| 2020/0238952 A1* | 7/2020 | Lindsay ............... G06V 30/194 |
| 2020/0294220 A1 | 9/2020 | Gonzalez Diaz et al. |
| 2020/0312063 A1 | 10/2020 | Balakrishnan et al. |
| 2020/0327345 A1 | 10/2020 | Schumacher et al. |
| 2020/0342230 A1 | 10/2020 | Tsai et al. |
| 2020/0342235 A1 | 10/2020 | Tsai et al. |
| 2020/0342274 A1 | 10/2020 | ElHattab et al. |
| 2020/0342506 A1 | 10/2020 | Levy et al. |
| 2020/0342611 A1 | 10/2020 | ElHattab et al. |
| 2020/0344301 A1 | 10/2020 | ElHattab et al. |
| 2020/0371773 A1 | 11/2020 | Kato et al. |
| 2020/0389415 A1 | 12/2020 | Zhao et al. |
| 2021/0006950 A1 | 1/2021 | Hajimiri et al. |
| 2021/0073626 A1 | 3/2021 | Brahma et al. |
| 2021/0104159 A1* | 4/2021 | Tsai ....................... G06V 40/16 |
| 2021/0201666 A1 | 7/2021 | Pelleg et al. |
| 2021/0245749 A1 | 8/2021 | Ross et al. |
| 2021/0279475 A1* | 9/2021 | Tusch ................. H04L 63/0861 |
| 2021/0287066 A1 | 9/2021 | Xie et al. |
| 2021/0337460 A1* | 10/2021 | Breaux, III ............. H04W 8/18 |
| 2021/0394775 A1 | 12/2021 | Julian et al. |
| 2021/0403004 A1* | 12/2021 | Alvarez ................ G06F 18/214 |
| 2022/0005332 A1* | 1/2022 | Metzler ............ G08B 13/19647 |
| 2023/0219592 A1 | 7/2023 | Calmer et al. |
| 2023/0298410 A1 | 9/2023 | Calmer et al. |

OTHER PUBLICATIONS

U.S. Pat. No. 11,352,013, Refining Event Triggers Using Machine Learning Model Feedback, Jun. 7, 2022.

U.S. Pat. No. 11,352,014, Tuning Layers of a Modular Neural Network, Jun. 7, 2022.

U.S. Pat. No. 11,386,325, An Ensemble Neural Network State Machine for Detecting Distractions, Jul. 12, 2022.

U.S. Appl. No. 17/726,386, Dynamic Delivery of Vehicle Event Data, Apr. 21, 2022.

U.S. Appl. No. 17/475,114, Dash Cam With Artificial Intelligence Safety Event Detection, Sep. 14, 2021.

U.S. Appl. No. 17/661,689, Refining Event Triggers Using Machine Learning Model Feedback, May 2, 2022.

U.S. Appl. No. 17/662,622, Tuning Layers of a Modular Neural Network, May 9, 2022.

* cited by examiner

ENSEMBLE NEURAL NETWORK STATE MACHINE FOR DETECTING DISTRACTIONS

CROSS-REFERENCE TO RELATED APPLICATIONS

This application is a continuation of U.S. patent application Ser. No. 17/454,799, filed Nov. 12, 2021, entitled "AN ENSEMBLE NEURAL NETWORK STATE MACHINE FOR DETECTING DISTRACTIONS," which is hereby incorporated by reference herein in its entirety and for all purposes. Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to devices, systems, and methods that provide real-time safety event detection within a vehicle.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Processing sensor data from a vehicle that is usable to detect, in real-time, events that are indicative of a crash or increased risk of a crash, requires significant data storage and processing power. The sensor data may be transmitted to a single-shot event detector to detect the events. However, the single-shot event detector may include a single detector that receives sensor data and detects the events. Thus, retraining and/or fine tuning the single-shot event detector is typically limited due to a lack of compute capabilities and may be time and cost-prohibitive.

SUMMARY

The systems, methods, and devices described herein each have several aspects, no single one of which is solely responsible for its desirable attributes. Without limiting the scope of this disclosure, several non-limiting features will now be described briefly.

Further, as described herein, according to various embodiments, systems and or devices may be configured and/or designed to implement a machine learning system as a modular neural network (e.g., a segmented neural network) to enable the tuning of individual layers of network. The systems and/or devices may gather metadata associated with a user of the vehicle, the vehicle, or a vehicle device implementing the modular neural network. The systems and/or devices can segment a neural network into a modular neural network based on the obtained metadata to define individual layers or models of the modular neural network for independent tuning of each individual layer or model. Further, the neural network may be implemented as an ensemble neural network that can include a plurality of layers or constituent models. For example, the ensemble neural network can include a model for face and/or hand detection, a model for hand action classification, a model for face pose classification, a model for detecting the occurrence of a particular event, and/or a model for determining a stop time and/or end time of the event. In some embodiments, the neural network may be implemented as a modular neural network and an ensemble neural network.

Additionally, the present disclosure describes various embodiments of a neural network that is the result of significant development. This non-trivial development has resulted in the modular neural network described herein which may provide significant increases and advantages over previous systems including increases in efficiency, cost-effectiveness, and accuracy. The modular neural network may reduce the down time required to update a particular layer or model of the modular neural network. This can increase the efficiency and accuracy of the modular neural network . Further the neural network may be implemented as an ensemble neural network that may increase the accuracy of the detection of particular events (e.g., the detection of a distracted state of a user of a vehicle). For example, by implementing an ensemble neural network with separate models or layers that each generate inferences that are pooled together, the accuracy and the efficiency of the event detection process can be increased.

Various embodiments of the present disclosure provide improvements to various technologies and technological fields, and practical applications of various technological features and advancements. For example, as described above, existing machine vision systems are limited in various ways, and various embodiments of the present disclosure provide significant improvements over such technology, and practical applications of such improvements. Additionally, various embodiments of the present disclosure are inextricably tied to, and provide practical applications of, computer technology. While currently available devices do enable a system to retrain or tune a machine learning model while the device is offline before redeploying the retrained machine learning model, such devices may require the device to be offline for the retraining of the machine learning model and may require tuning the entire machine learning model. Due to the retraining process and the offline status of the device, it is time consuming and costly to efficiently retrain the entire machine learning model to adjust how events are detected. Additionally, during the retraining process, the loss in efficiency can be significant so just redeploying the retrained machine learning model in a timely and efficient manner can be a significant issue. Further, due to the operations required for event detection, it is time consuming and costly to implement a single machine learning model for identifying the distracted state.

Advantageously, various embodiments of the present disclosure may overcome various disadvantages of prior systems and methods. A vehicle device may include a computer readable storage medium having program instructions embodied therewith and one or more processors to execute the program instructions. The vehicle device may access metadata associated with a user of a vehicle. The metadata may include at least one of one or more characteristics of the user or one or more characteristics of the vehicle. Further, the vehicle device may compare the metadata with segmentation data. The segmentation data may identify statistics associated with tuning particular models. Further, the vehicle device may determine how to segment a neural network based on comparing the metadata with the segmentation data. Further, the vehicle device may segment the neural network to generate a modular neural network based at least in part on determining how to segment the neural network. The modular neural network may include a plurality of models. Each of the plurality of models may be independently tunable and trainable to identify corresponding features of sensor data. Further, the vehicle device may obtain sensor data. The sensor data may identify the user of the vehicle. Further, the vehicle device may execute the modular neural network based on the sensor data. The modular neural network may output a probability of a distracted state of the user of the vehicle. Further, the vehicle device may identify a particular model of the plurality of models based at least in part on the probability of the distracted state of the user of the vehicle. Further, the vehicle device may independently tune the particular model based at least in part on the probability of the distracted state of the user of the vehicle.

According to various embodiments, of the present disclosure, a vehicle device may include a computer readable storage medium having program instructions embodied therewith and one or more processors to execute the program instructions. The vehicle device may access metadata associated with a user of a vehicle. Further, the vehicle device may segment a neural network to generate a modular neural network based at least in part on the metadata associated with the user of the vehicle. The modular neural network may include a plurality of models. Each of the plurality of models may be independently tunable and trainable to identify corresponding features of sensor data. Further, the vehicle device may obtain sensor data. The sensor data may identify the user of the vehicle. Further, the vehicle device may execute the modular neural network based on the sensor data. The modular neural network may output a probability of an event associated with the user of the vehicle. Further, the vehicle device may identify a particular model of the plurality of models based at least in part on the probability of the event. Further, the vehicle device may independently tune the particular model based at least in part on the probability of the event.

In various embodiments, the plurality of models may include a face detection model, a hand detection model, a hand action classification model, a head pose classification model, or a gaze detection model.

In various embodiments, the modular neural network may further include a plurality of layers. The plurality of models may be distributed across the plurality of layers.

In various embodiments, the metadata may be specific to the user of the vehicle and the user may be a specific individual or a plurality of individuals.

In various embodiments, the metadata may be specific to the vehicle.

In various embodiments, the vehicle device may periodically update the metadata associated with the user of the vehicle.

In various embodiments, to obtain the sensor data, the vehicle device may obtain the sensor data from a plurality of sensors.

In various embodiments, the sensor data may include at least one of camera

In various embodiments, the vehicle device may store the probability of the event to generate a stored probability of the event. Further, the vehicle device may execute the modular neural network based on additional sensor data. The modular neural network may output an additional probability of the event associated with the user of the vehicle. Further, the vehicle device may compare the stored probability of the event with the additional probability of the event. Further, the vehicle device may identify timing information associated with the event based at least in part on comparing the stored probability of the event with the additional probability of the event.

In various embodiments, to obtain the probability of the event, the vehicle device may obtain the probability of the event at a frame by frame level.

In various embodiments, the modular neural network may include a frame classifier pipeline and a sequence detector pipeline. The particular model may include one or more of the frame classifier pipeline or the sequence detector pipeline.

In various embodiments, to identify the particular model, the vehicle device may identify an error associated with the particular model.

In various embodiments, to identify the particular model, the vehicle device may identify an error associated with the modular neural network. The error may indicate that the event is a false positive event. Further, the vehicle device may determine the error is associated with the particular model.

In various embodiments, the vehicle device may train the modular neural network. Further, to independently tune the particular model, the vehicle device may independently train the particular model subsequent to training the modular neural network.

In various embodiments, the vehicle device may train the modular neural network. Further, to independently tune the particular model, the vehicle device may independently train the particular model without training at least one other model of the plurality of models subsequent to training the modular neural network.

In various embodiments, the vehicle device may obtain input from a user computing device. Further, to identify the particular model, the vehicle device may identify the particular model based at least in part on the input.

In various embodiments, the vehicle device may provide the probability of the event to a user computing device and obtain input from the user computing device based at least in part on the probability of the event. Further, to identify the particular model, the vehicle device may identify the particular model based at least in part on the input.

In various embodiments, the sensor data may include streaming sensor data.

According to various embodiments of the present disclosure, a method can include accessing metadata associated with a user of a vehicle. The method may further include segmenting a neural network to generate a modular neural network based at least in part on the metadata associated with the user of the vehicle. The modular neural network may include a plurality of models. Each of the plurality of models may be independently tunable and trainable to identify corresponding features of sensor data. The method may further include obtaining sensor data. The sensor data may identify the user of the vehicle. The method may further include executing the modular neural network based on the sensor data. The modular neural network may output a probability of an event associated with the user of the vehicle. The method may further include identifying a particular model of the plurality of models based at least in part on the probability of the event. The method may further include independently tuning the particular model based at least in part on the probability of the event.

According to various embodiments, of the present disclosure, a vehicle device may include a computer readable storage medium having program instructions embodied therewith and one or more processors to execute the program instructions. The vehicle device may access sensor data from one or more sensors associated with a vehicle. The sensor data may be associated with an image of a scene. Further, the vehicle device may execute an ensemble neural network configured to detect occurrence of a safety event associated with a driver of the vehicle. The safety event may indicate a distracted state of the driver of the vehicle. The ensemble neural network may include a plurality of models including a first model to detect a face and a hand of a user of the vehicle based at least in part on the sensor data, a second model to detect one or more hand actions of the user based at least in part on the detected hand of the user, a third model to detect a head pose of the user based at least in part on the detected face of the user, a fourth model to detect a gaze of the user based at least in part on the detected face of the user, and a fifth model to predict, based at least in part on the one or more hand actions, the head pose, and the gaze, a probability of a safety event associated with the user of the vehicle. Further, the vehicle device may, in response to determining at least that the probability of the safety event exceeds a threshold, trigger an event alert indicative of occurrence of the safety event.

According to various embodiments, of the present disclosure, a vehicle device may include a computer readable storage medium having program instructions embodied therewith and one or more processors to execute the program instructions. The vehicle device may access sensor data from one or more sensors associated with a vehicle. Further, the vehicle device may execute an ensemble neural network to detect occurrence of a safety event associated with a driver of the vehicle. The ensemble neural network may include a plurality of models including a first model to detect a face and a hand of a user of the vehicle based at least in part on the sensor data, a second model to detect one or more hand actions of the user based at least in part on the detected hand of the user, a third model to detect a head pose of the user based at least in part on the detected face of the user, and a fourth model to predict, based at least in part on the one or more hand actions and the head pose, a probability of the safety event associated with the user of the vehicle. Further, the vehicle device may, in response to determining at least that the probability of the safety event exceeds a threshold, trigger an event alert indicative of occurrence of the safety event.

In various embodiments, the first model may include a face and hand detection model. The second model may include a hand action classification model. The third model may include a head pose classification model.

In various embodiments, the plurality of models further may include a fifth model. The fifth model may be a gaze detection model. The fifth model may detect one or more eye gaze angles based at least in part on the detected face of the user. The fourth model may predict the probability of the safety event associated with the user of the vehicle further based at least in part on the one or more eye gaze angles.

In various embodiments, the ensemble neural network may further include a plurality of layers. The plurality of models may be distributed across the plurality of layers.

In various embodiments, a first layer of the plurality of layers of the ensemble neural network may include the first model and the second model and a second layer of the plurality of layers of the ensemble neural network may include the third model.

In various embodiments, to access the sensor data, the vehicle device may obtain the sensor data from a plurality of sensors.

In various embodiments, the sensor data may include at least one of camera data, accelerometer data, audio data, or location data.

In various embodiments, the vehicle device may store the event alert to generate a stored event alert. Further, the vehicle device may trigger an additional event alert indicative of occurrence of the safety event. Further, the vehicle device may compare the stored event alert with the additional event alert. Further, the vehicle device may identify timing information associated with the event based at least in part on comparing the stored event alert with the additional event alert.

In various embodiments, to trigger the event alert, the vehicle device may trigger the event alert at a frame by frame level.

In various embodiments, the ensemble neural network may include a frame classifier pipeline and a sequence detector pipeline.

In various embodiments, the safety event may indicate a distracted state of the user.

In various embodiments, the vehicle device may train the ensemble neural network.

In various embodiments, the first model may further detect the face by identifying one or more face bounding boxes and detect the hand by identifying one or more hand bounding boxes.

In various embodiments, the third model may detect the head pose by detecting one or more of a yaw, a pitch, or a roll angle.

In various embodiments, the one or more hand actions may include at least one of a neutral hand action, a hand interacting with a phone hand action, or a hand interacting with food hand action.

In various embodiments, the fourth model may predict the probability of the safety event based on outputs from at least the first model, the second model, and the third model.

In various embodiments, the plurality of models may include a fifth model to detect a start time and an end time of the safety event based at least in part on the probability of the safety event.

In various embodiments, the sensor data may include streaming sensor data.

According to various embodiments of the present disclosure, a method can include accessing sensor data from one or more sensors associated with a vehicle. The method may further include executing an ensemble neural network to detect occurrence of a safety event associated with a driver of the vehicle. The ensemble neural network may include a plurality of models including a first model to detect a face and a hand of the user of the vehicle based at least in part on the sensor data, a second model to detect one or more hand actions of the user based at least in part on the detected hand of the user, a third model to detect a head pose of the user based at least in part on the detected face of the user, and a fourth model to predict, based at least in part on the one or more hand actions and the head pose, a probability of the safety event. The method may further include, in response to determining at least that the probability of the safety event exceeds a threshold, trigger an event alert indicative of the occurrence of the event.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1A:
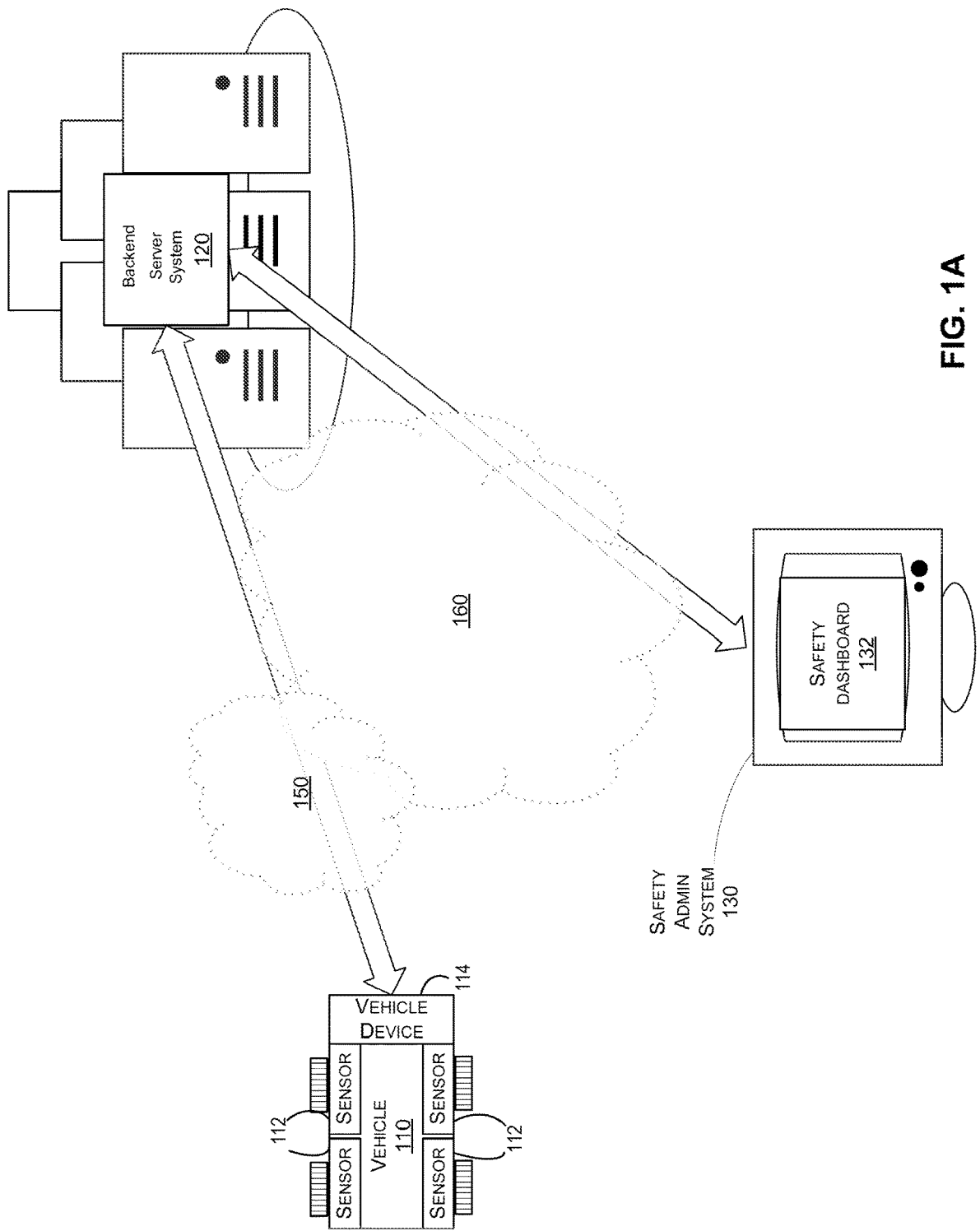
FIG. 1A illustrates a backend server system in communication with a vehicle device and a safety admin system.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

An improved artificial intelligence dash cam provides real-time alerts of detected safety events, such as driver assistance (e.g., ADAS or "Advanced Driver Assistance Systems"), harsh events, and/or other events of interest. The dash cam is installable into existing vehicles and provides real-time alerts based on processing of video data from one or more cameras of the dash cam. The safety event detection is performed local to the dash cam without transmitting data to a backend server for processing, so that the alerts are immediately actionable by the vehicle driver in reducing frequency and severity of accidents.

In some embodiments, the dash cam (which is referred to more generally as a "vehicle device") is configured to execute one or more neural networks (and/or other artificial intelligence or program logic), such as based on input from one or more of the cameras and/or other sensors associated with the dash cam, to intelligently detect safety events. The dash cam includes logic for determining which asset data to transmit to a backend server in response to detection of a safety event, as well as which asset data to transmit to the backend server in response to analysis of sensor data that did not trigger a safety event. The asset data transmitted to the backend server may be further analyzed to determine if further alerts should be provided to the driver and/or to a safety manager.

In some embodiments, the backend server (also referred to herein as the "backend," the "cloud," an "event analysis system," or a "backend server system") may have context and perspective that individual vehicle devices do not have. For example, the backend may include data associate with a large quantity of vehicles, such as vehicles across a fleet or within a geographic area. Thus, the backend may perform analysis of asset data across multiple vehicles, as well between groups of vehicles (e.g., comparison of fleets operated by different entities). The backend can use uploaded asset data to optimize for both customer experience and data transfer quantity. For example, using metadata from a safety event (whether a false or positive safety event), the backend can make an informed go/no-go decision on whether a particular event should be shown in a safety dashboard or whether it may be a false positive. The backend may then decide whether asset data associated with the safety event should be transmitted from the vehicle device to the backend, for example only if the detected event is a positive event or an event meeting certain criteria. Thus, the amount of data transmitted to the backend server may be largely reduced, while maintaining the ability for the backend server to obtain as much data as needed to improve the event models (e.g., the neural networks that are executed on the vehicle device), further analyze asset data for applicability of safety events, and transmit corresponding alerts. A backend server system may also include a feedback system that periodically updates event models used by vehicle devices to provide immediate in-vehicle alerts, such as when the backend server has optimized an event model based on analysis of asset data associated with many safety events, potentially across multiple fleets of vehicles.

In various embodiments, the vehicle device can implement a machine learning model for detection of particular events. The machine learning model implemented by the vehicle device may be an ensemble machine learning model, which generally refers to pooling of inferences from multiple machine learning models to identify the occurrence or non-occurrence of an event. Further, the machine learning model implemented by the vehicle device may be a modular machine learning model. For example, the modular machine learning model may include a modifiable series of layers that can be segmented. The segmentation of the modular machine learning model can enable the independent tuning and retraining of defined thin layers of the modular machine learning model. Further, the machine learning model may be a multi-modal machine learning model. For example, the multi-modal machine learning model may receive sensor data from a plurality of sources (e.g., a camera, an accelerometer, a location detection system, etc.). Further, the machine learning model may be a stateful machine learning model. For example, the stateful machine learning model may store start and end times for events in order to make inferences about the start and end times of particular events.

The vehicle device may implement the machine learning model and receive sensor data associated with the vehicle device. In some embodiments, the machine learning model may be a multi-modal machine learning model and the sensor data may be associated with multiple sensors and/or multiple types of sensor data. The machine learning model may further receive metadata associated with the user, the vehicle, the vehicle device, etc. The vehicle device may use the metadata to segment the machine learning model into a modular machine learning model. For example, the metadata may identify that a particular user often requires retraining of a hand detection model (e.g., because the user of the vehicle often wears different gloves, the user is often holding different items, etc.). Based on the metadata, the vehicle device can define a thin layer of the modular machine learning model that includes a subset of the modular machine learning model (e.g., the hand detection model). By defining a modular machine learning model that includes a thin layer, the vehicle device can enable the independent tuning and retraining of the machine learning model without tuning and retraining the entire modular machine learning model. Therefore, based on identifying that the modular machine learning model should be updated, the vehicle device can independently tune and train each layer based on the desired updates. The retraining and/or fine tuning of a machine learning model may be time consuming and expensive. The modular machine learning model may increase the efficiency of the retraining and tuning process by enabling the vehicle device to independently tune and train a thin layer of the modular machine learning model.

Further, the vehicle device may implement an ensemble machine learning model that implements multiple machine learning models in an iterative process to generate a total output based on the outputs of each of the machine learning models. The machine learning models can be implemented as layers of machine learning models and each layer can receive results from a prior layer and provide subsequent results to a subsequent layer. In an example implementation, a first layer of an ensemble machine learning model may include one or more machine learning models for the detection of a head and at least one hand of a user of a vehicle. A second layer of the ensemble machine learning model may include one or more machine learning models for the detection of hand actions, head poses, and/or gazes of the user based on the output of the first layer. A third layer of the example ensemble machine learning model may include one or more machine learning models for the prediction of a probability that the user is distracted. A fifth layer of the example ensemble machine learning model may include a stateful machine learning model to predict a start time and/or end time of the distraction of the user. As will be discussed further herein, other embodiments of ensemble machine learning models may include other types, quantities, and/or configurations of models in a layered architecture.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Vehicle Device: an electronic device that includes one or more sensors positioned on or in a vehicle. A vehicle device may include sensors such as one or more video sensors, audio sensors, accelerometers, global positioning systems (GPS), and the like. Vehicle devices include communication circuitry configured to transmit event data to a backend (or "backend server system"). Vehicle devices also include memory for storing software code that is usable to execute one or more event detection models, such as neural network or other artificial intelligence programming logic, that allow the vehicle device to trigger events without communication with the backend.

Event of interest (or "event"): circumstances of interest to a safety manager, fleet administrator, vehicle driver, and/or others. Events may be identified based on various combinations of features (as described below) or other characteristics associated with one or more vehicles. For example, an event associated with a vehicle may indicate a safety concern, such as a likelihood of a crash by the vehicle is above an expected threshold level.

Safety Event: an event that indicates an accident involving a vehicle, such as a crash of the vehicle into another vehicle or structure, or an event that indicates an increased likelihood of a crash of vehicle.

Driver Assistance Event: one type of safety event that does not necessarily indicate a crash, or imminent crash, but indicates that the driver should take some action to reduce likelihood of a crash. For example, driver assistance events may include safety events indicating that a vehicle is tailgating another vehicle, the vehicle is at risk of a forward collision, or the driver of the vehicle is distracted.

Harsh Event: one type of safety event indicating an extreme action of a driver and/or status of a vehicle. Harsh events may include, for example, detecting that a driver has accelerated quickly, has braked extensively, has made a sharp turn, or that the vehicle has crashed.

Event Model (or "triggering criteria"): a set of logic that may be applied to asset data to determine when an event has occurred. An event model may be, for example, an algorithm, statistical model, or neural network that takes as input one or more types of asset data. An event model may be stored in any format, such as a list of criteria, rules, thresholds, and the like, that indicate occurrence of an event. Event models may be executed by a vehicle device and/or by a backend server system (e.g., in the cloud).

Sensor Data: any data obtained by the vehicle device, such as asset data and metadata.

Event Data: data associated with an event, such as a set of sensor data (e.g., metadata and/or asset data), such as photographs, video files, etc., associated with a detected safety event.

Asset Data (or "Asset"): any data associated with a vehicle and/or driver of the vehicle, such as data that is usable by an event model to indicate whether a safety event has occurred. Asset data may include video files, still images, audio data, and/or other data files. Example of asset data include:
  Video files, which may be uploaded for each camera of a multi-camera vehicle device. Video files that are uploaded to the backend server system may be trimmed to a default length by the vehicle device (e.g., 3 seconds before and 3 seconds after the detected safety event) and/or may be selected based on rules associated with the detected event. Video transcode may be customized to adjust the bit rate, frame rate, resolution, etc. of video files.

Still Images from each camera, e.g., single frames of a video file, may be transmitted to the backend server system either as part of initial event data transmitted to the backend server system after detecting a safety event and/or in response to a request for still images from the backend server system. In situations where the backend server system requests still images from a vehicle device, the backend server system may determine image settings (e.g., image quality, downsampling rate, file size, etc.), as well as timeframe from which images are requested (e.g., one image every 0.2 seconds for the five second time period preceding the detected event).

Audio data can be combined with video, or sent separately and transcoded into video files after the fact. The backend server system may determine audio transcoding parameters for requested audio data.

Metadata: data that provides information regarding a detected event, typically in a more condensed manner than the related asset data. Metadata may include, for example, accelerometer data, global positioning system (GPS) data, ECU data, vehicle speed data, forward camera object tracking data, inward (driver)-facing camera data, hand tracking data and/or any other related data. For example, metadata regarding a triggered event may include a location of an object that triggered the event, such as a vehicle in which a forward collision warning ("FCW") or tailgating safety event has triggered, or position of a driver's head ("head pose") when a distracted driver event has triggered. Metadata may include calculated data associated with a detected safety event, such as severity of the event, which may be based on one or more event models that may consider duration of an event, distance to a leading vehicle, and/or other event data. Metadata may include information about other vehicles within the scene in the case of tailgating or FCW event, as well as confidence levels for these detections. Metadata may also include information such as event keys and other identification information, event type, event date and time stamps, event location, and the like.

Features: an "interesting" part of sensor data, such as data that is extracted from and/or derived from sensor data and may provide an abstraction of the sensor data. Event models may identify features, such as those that are useful in triggering a safety event. Features may include items (and/or metadata associated with those Items) such as objects within images obtained by one of the cameras of the dash cam. Other examples of features may include gaze, eye pose, head pose, objects in images, other vehicle metadata, such as GPS, acceleration, and the like.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Example Event Detection Models

As will be discussed further herein, the vehicle device and/or the backend server system may implement certain machine learning techniques that are configured to identify features within sensor data, such as in images from one or more of the outward-facing or inward-facing cameras of the vehicle device, audio detected by one or more microphones of the vehicle device, metadata from other sensors, and the like. The feature detection may be performed by a one or more feature detection module (e.g., part of the vehicle device and/or the event detection system), which may include program code executable by one or more processors to analyze video data, audio data, sensor data (e.g., motion sensors, positioning, etc.) and/or any other sensor data. While some of the discussion herein is with reference to analysis of video data, such discussions should be interpreted to also cover analysis of any other type of data, such as any asset data.

In some embodiments, the vehicle device can process video data locally to identify various associated features, such as detection of an object (e.g., a person or a vehicle), characteristics of the object (e.g., speed, distance, dimensions, etc.), location of the object within the image files of the video, and the like. This feature data comprises metadata, which can be indexed (e.g., to a corresponding video recording or video feed) to track the time ranges that each detection begins and ends in video data. Such metadata, and other optimized data, can then be analyzed by event detection models executing on the vehicle device and/or selectively transmitted to the backend server system.

In some embodiments, the feature detection module and/or event models (e.g., executed by the vehicle device or the backend server system) can include a machine learning component that can be used to assist in detection of safety events, such as in real-time at the vehicle device. For example, the machine learning component can implement machine learning algorithms or artificial intelligence (AI) to generate and/or update neural networks that are executed by a processor (e.g., in the vehicle device and/or the backend server system). In some embodiments, the machine learning component can use one or more machine learning algorithms to generate one or more models or parameter functions for the detections. In some embodiments, the feature detection module and/or the event models may implement an ensemble model, a modular model, a multi-modal model, and/or a stateful model. For example, the feature detection module and/or the event models may comprise a plurality of layered and/or hierarchical models that each produce an output that is pooled together. Further, the feature detection module and/or the event models may comprise a thin layer of models that is independently defined and tunable. The machine learning component can be configured to generate an event model that understands which types of data indicate which types of detections. One or more of these event models may be used to determine an expected value or occurrence based on analysis of received data. In some embodiments, video recording criteria (e.g., pre-configured video recording criteria) can be designated by a user, admin, or automatically. For example, the video recording criteria can indicate which types of detected features to monitor, record, or analyze. By designating specific types of detections, resources (e.g., processing power, bandwidth, etc.) can be preserved for only the types of feature detections desired.

Various types of algorithms may be used by the machine learning component to generate the event detection models (e.g., that perform feature detection and related event detection). For example, certain embodiments herein may use a logistical regression model, decision trees, random forests, convolutional neural networks, deep networks, or others. However, other event detection models are possible, such as a linear regression model, a discrete choice model, or a generalized linear model. The machine learning algorithms can be configured to adaptively develop and update the event detection models over time based on new input received by the machine learning component. For example, the event detection models executed by the vehicle device may be regenerated on a periodic basis (e.g., by the backend server system) as new received data is available to help keep the predictions in the event detection model more accurate as the data is collected over time. Also, for example, the event detection models may be regenerated based on configurations received from a user or management device.

Some non-limiting examples of machine learning algorithms that can be used to generate and update event detection models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, copious amounts (such as terabytes or petabytes) of received data may be analyzed to generate models without manual analysis or review by one or more people.

Example Event Analysis System and Vehicle Device

FIG. 1A illustrates a backend server system 120 in communication with a vehicle device 114 and a safety admin system 130. In this embodiment, the vehicle 110 includes a vehicle device 114, which may physically incorporate and/or be coupled to (e.g., via wired or wireless communication channel) a plurality of sensors 112. In some embodiments, the vehicle device 114 comprises a dash cam, such as the example dash cam illustrated in FIGS. 1B-1D. In other embodiments, the vehicle device 114 may include other components.

The sensors 112 may include, for example, one or more inward-facing camera and one or more outward-facing camera. The vehicle device 114 further includes one or more microprocessors and communication circuitry configured to transmit data to the backend server system 120, such as via one or more of the networks 150, 160. In this example, a safety dashboard 132 may be generated on a safety admin system 130 to illustrate event data from the backend server system 120, such as via an online portal, e.g., a website or standalone application. The safety admin system 130 may be operated, for example, by a safety manager that reviews information regarding triggered safety events associated with a fleet of drivers/vehicles.

Various example computing devices 114, 120, and 130 are shown in FIG. 1A. In general, the computing devices can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A computing device may execute an application (e.g., a browser, a stand-alone application, etc.) that allows a user to access interactive user interfaces, view images, analyses, or aggregated data, and/or the like as described herein. In various embodiments, users may interact with various components of the example operating environment (e.g., the safety admin system 130, the backend server system 120, etc.) via various computing devices. Such interactions may typically be accomplished via interactive graphical user interfaces or voice commands, however alternatively such interactions may be accomplished via command line, and/or other means.

As shown in the example of FIG. 1A, communications between the vehicle device 114 and backend server system 120 primarily occurs via network 150, while communication between the backend server system 120 and safety admin system 130 typically occurs via network 160. However, networks 150, 160 may include some or all of the same communication protocols, services, hardware, etc. Thus, although the discussion herein may describe communication between the vehicle device 114 and the backend server system 120 via the network 150 (e.g., via cellular data) and communication between the backend server system 120 and the safety admin system 130 via a wired and/or a wireless high-speed data communication network, communications of the devices are not limited in this manner.

In some embodiments, the vehicle device transmits encrypted data via SSL (e.g., 256-bit, military-grade encryption) to the backend server system 120 via high-speed 4 G LTE or other wireless communication technology, such as 5 G communications. The network 150 may include one or more wireless networks, such as a Global System for Mobile Communications (GSM) network, a Code Division Multiple Access (CDMA) network, a Long Term Evolution (LTE) network, or any other type of wireless network. The network 150 can use protocols and components for communicating via the Internet or any of the other aforementioned types of networks. For example, the protocols used by the network 150 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The network 160 may similarly include any wired network, wireless network, or combination thereof. For example, the network 160 may comprise one or more local area networks, wide area network, wireless local area network, wireless wide area network, the Internet, or any combination thereof.

Figure 1B:
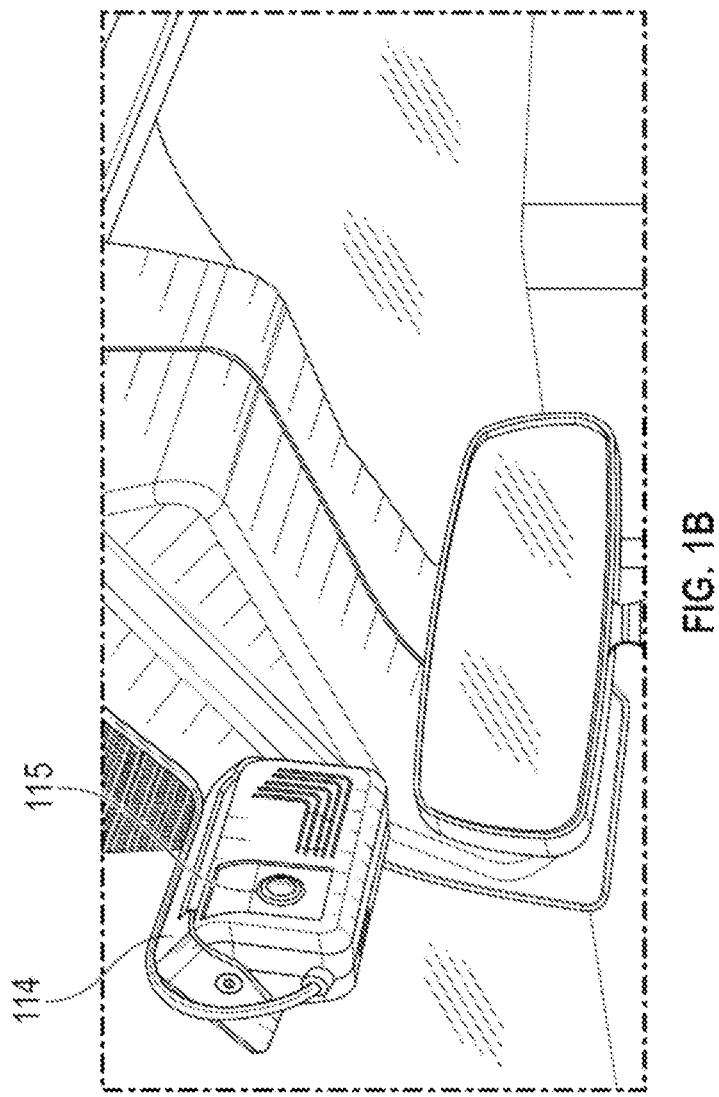
FIG. 1B illustrates an example vehicle device mounted inside a vehicle.
Figure 1C:
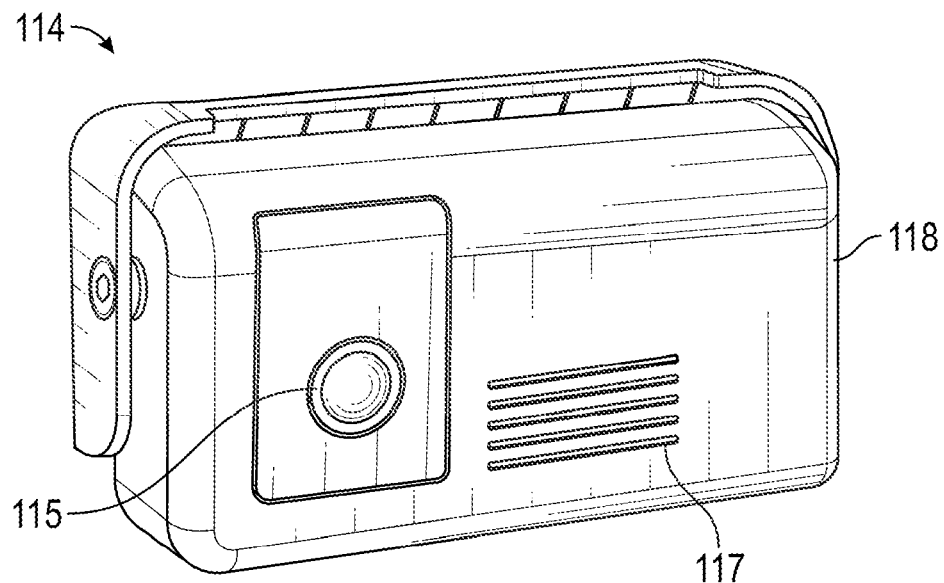
FIG. 1C is a front view of the vehicle device of FIG. 1B, showing the inward-facing camera.
Figure 1D:
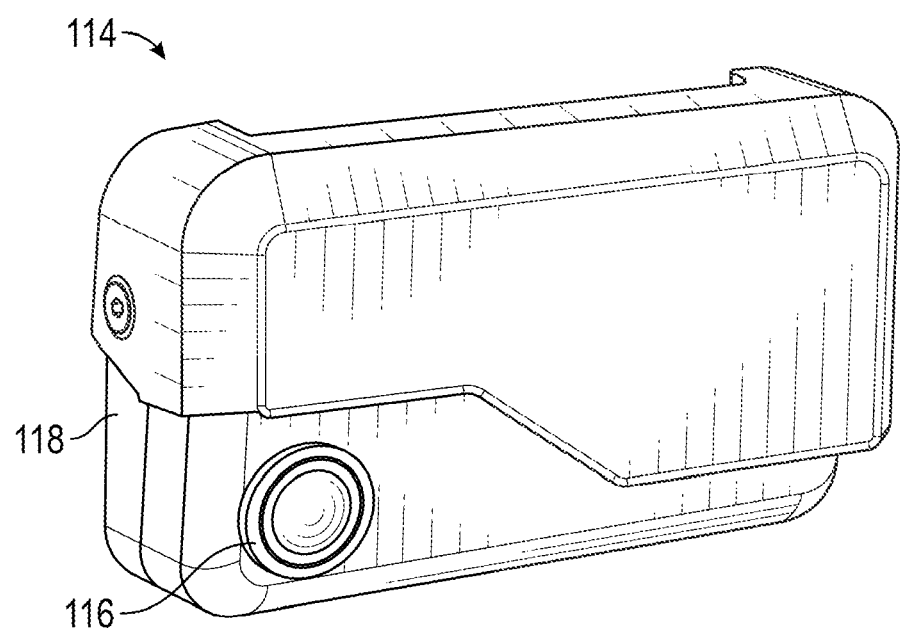
FIG. 1D is a rear view of the vehicle device of FIG. 1B, showing an outward-facing camera.

FIG. 1B illustrates an example vehicle device 114 with an inward-facing camera 115 mounted inside a vehicle. FIG. 1C is a front view of the vehicle device 114 showing the inward-facing camera 115, and FIG. 1D is a rear view of the vehicle device 114 showing an outward-facing camera 116 (e.g., positioned to obtain images forward of the vehicle). In this example, the vehicle device 114 includes an access panel 117 configured to allow alert signals from a speaker within the enclosure 118 of the vehicle device 114 to be better heard within the vehicle. In some embodiments, a microphone is positioned behind the access panel 117 also, or behind a similar additional access panel. In other embodiments, the vehicle device may include different quantities of video and/or still image cameras. These dual-facing cameras (e.g., the inward-facing camera 115 and one or more outward-facing cameras 116) may be configured to automatically upload and/or analyze footage using event detection models configured to detect (or "trigger") safety events. For example, as discussed further herein, the vehicle device 114 may advantageously apply event detection models to sensor data, including video data from one or more of the cameras, to detect safety events in real time as the events are happening. While the specifications of vehicle devices may vary greatly from one implementation to another, in one example embodiment a vehicle device may include some or all of the components below:

- Outward-facing camera with a field of view of 121° or more, resolution of at least 1080 p (Full HD) video, frame rate of at least 30 frames per second, HDR to optimize for bright and low-light conditions.
- Inward-facing camera with a field of view of 177° or more to identify unsafe in-cab behaviors, resolution of at least 720 p (HD) video, frame rate of at least 30 frames per second, infrared LED for unlit nighttime in-cab video.
- Audio input and/or output device(s) configured to provide voice coaching, such as voice-based feedback and alerts in response to detection of safety events, as well as the ability to turn on audio capture (e.g., via one or more microphones) for extra context during disputes and incidents.
- Recording capabilities and storage to record video footage for a rolling time period. For example, 60-100 hours or more of driving time video may be stored on the vehicle device, with an option for retrieval by the backend server system, such as to provide additional context associated with a detected safety event in a safety dashboard. Video data may be automatically uploaded to an backend server system (e.g., in the cloud) for further analysis, such as automatically uploading five seconds before to five seconds after each safety event is detected. Still images may also be captured and stored locally and/or transmitted to the backend server system. A panic button may be provided to allow the driver to manually trigger a safety event and upload video footage from one or more of the cameras. For example, the panic button may be a physical button on the vehicle device enclosure 118 and/or a virtual (or software) button that may be activated by a voice command from the driver (or a passenger in the vehicle).
- Data transfer circuitry configured to automatically upload event data (e.g., metadata and asset data) to the backend server system, where the event data may be further analyzed. In some implementations, the data transfer circuitry is configured to detect availability of cellular connectivity and, when connectivity is below a threshold, delay transmission of until cellular connectivity improves.
- Mounting hardware for easily mounting on the inside of a windshield, such as with heavy duty acrylic foam tape, suction cup, velcro, or the like. Tilt control to allow for proper inward-facing orientation with a wide variety of windshields.
- One or more accelerometers, such as accelerometers that measure acceleration (and/or related G forces) in each of multiple axes, such as in an X, Y, and Z axis.
- One or more computer processors, such as high-capacity processors that enable concurrent neural networks for real-time artificial intelligence.

Example Safety Event Detection and Communications

Figure 2:
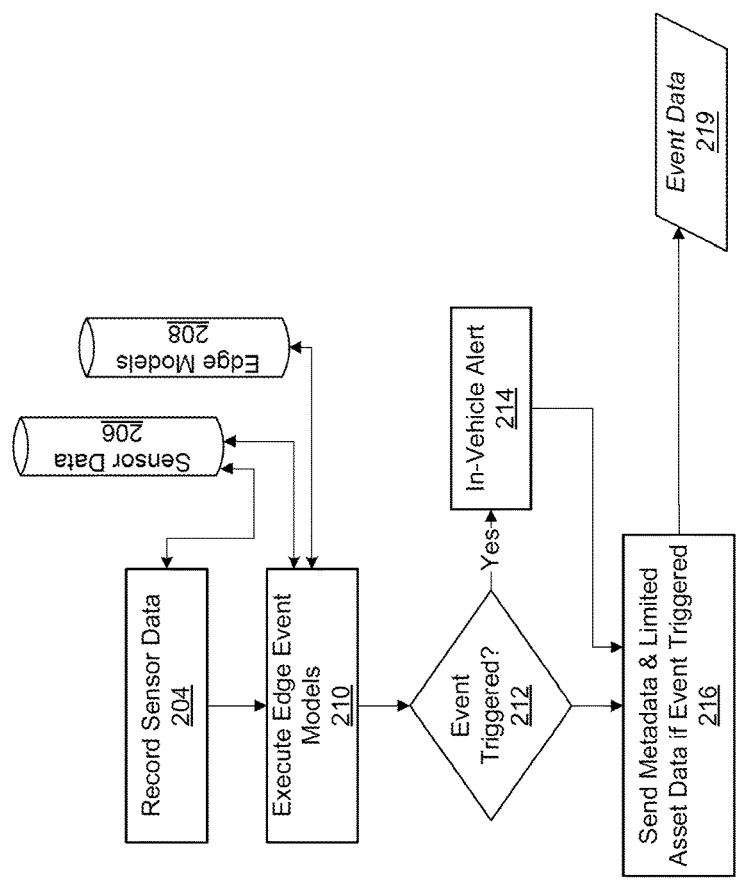
FIG. 2 is a flow diagram illustrating an example process for the vehicle device to detect safety events.

FIG. 2 is a flow diagram illustrating an example process for the vehicle device to detect safety events, such as by processing video data using one or more neural networks. In general, the processes are performed by the vehicle device. Depending on the embodiment, however, the processes may be performed by different devices than illustrated, the method may include fewer or additional blocks, and/or the blocks may be performed in an order different than is illustrated.

Beginning at block 204, sensor data (e.g., video data) is stored for processing by one or more event models. For example, sensor data output from the multiple sensors 112 associated with the vehicle device 114 of FIG. 1A may be recorded at block 204. As shown, at least some of the sensor data (e.g., metadata and asset data) is stored in a sensor data store 206. For example, video data and metadata from one or more sensors may be stored for a particular time period (e.g., 2, 12, 24 hours, etc.).

Next, at block 210, one or more event models, such as an ensemble model discussed below, are executed on the sensor data, which may be accessible via the sensor data store 206. In some embodiments, the event models executed at block 210 are configured to identify harsh events indicative of a sudden, extreme, and/or unexpected movement of the vehicle and/or driver. Related U.S. Application Ser. No. 63/113645, titled "Dynamic Delivery of Vehicle Event Data," filed on Nov. 13, 2020, which is hereby incorporated by reference in its entirety and for all purposes, includes further methods and circuitry for detecting harsh events. In addition, or as an alternative, to detection of harsh events, the vehicle device 114 advantageously executes one or more event models (e.g., neural networks) on sensor data, such as video data, to detect safety events, such as a tailgating, forward collision risk, and/or distracted driver event.

In some embodiments, the neural networks that are executed for detection of safety events at the vehicle device are optimized for low latency, high recall, and low precision, whereas neural networks that are executed at a backend server system may be optimized for higher precision. Thus, the neural networks executed on the vehicle device are optimized to be executed in real-time (e.g., low latency), to have a high proportion of actual positives identified correctly (e.g., high recall), and to not be overly concerned with the proportion of positive identifications that were actually correct (e.g., low precision). Accordingly, the outputs of the neural networks at the vehicle device may be provided in substantially real-time to the actual occurrence of a detected event, such that an alert and/or other preventative actions may be taken to minimize further risks. In contrast, the neural networks that are executed at the backend server system do not typically have the same time pressure and the backend server system includes significantly more processing power and bandwidth. Accordingly, in some embodiments neural networks for detecting safety events may be trained at the backend server system for use with the low latency, high recall, and low precision constraints associated with the vehicle device, and provided to the vehicle device periodically and/or when significant updates to the neural network are made.

In some embodiments, the event detection models executed at the vehicle device are performed on down-sampled images from the video feed. For example, a portion of the outward-facing video feed, such as a 300x300 pixel area of the 1920x1080 pixel video, may be extracted from the video feed to enable the low latency analysis needed to provide real-time alerts at the vehicle device. The extracted portion may change in size or position over time, such as in response to a periodic analysis of a frame of the video image to detect features of interest. In some embodiments, the additional asset data is periodically transmitted to the backend server system, regardless of detection of safety events. For example, in some implementations a still image from the outward-facing video camera may be transmitted to the backend server system every two minutes. Such additional asset data may be used in training the neural networks.

In some embodiments, the event detection settings, such as criteria and/or thresholds for detection of a safety event, may be determined by user configurable settings, allowing the user (e.g., an owner or manager of a fleet) to either use defaults based on vehicle type (e.g., passenger, light duty, or heavy duty), or to set custom combinations of conditions that are necessary for triggering of an event by the event detection models executed on the vehicle device. These event detection settings may be used in generation of event detection models, e.g., incorporated into the training data that is provided to a neural network, and/or applied algorithmically, e.g. as rules, to sensor data. For example, in some implementations event detection models are configured to detect conditions indicative of a safety event by processing video data, and to output an indication of any detected event along with a confidence level of event detection. These outputs from the neural network, along with other metadata and/or asset data, may then be used to evaluate user—configured event detection settings.

At block 212, if a safety event has been triggered the method continues to block 214 where an in-vehicle alert is provided within the vehicle and event data associated with the event is identified and transmitted to the backend server system (block 216). The in-vehicle alerts may be customized, such as based on the type of triggered event, severity of the event, driver preferences, etc. For example, in-vehicle alerts may include various audible signals and/or visual indicators of triggered safety events.

In some embodiments, alerts may also be transmitted to one or more devices external to the vehicle at block 214

In some implementations, the event data 219 that is transmitted to the backend server system upon detection of a driver assistance alert, such as based on neural network analysis of video data, may include metadata and only a limited (or no) other asset data. In some embodiments, event data that is transmitted to the backend server system is selected based on settings of the triggered safety event. For example, a first safety event may indicate that certain metadata is transmitted to the backend server system, while a second safety event may indicate that certain metadata and asset data, such as one or a few still images associated with the detected event, are transmitted upon detection of the event. For example, metadata that is transmitted to the backend server system may include location of the object that triggered the event, such as the lead vehicle in the case of a forward collision warning or tailgating, or the head of the driver in the case of a distracted driver event, severity of the event, such as based on rules like duration of the event, distance to the lead vehicle, etc. Metadata may further include information about other vehicles or objects within the field of view of the cameras, such as speed of other vehicles, head pose information (in the case of a distracted driver event), position and/or movement of the driver's hands (e.g., coordinates, width, height) in the case of a hand-related policy violation, type of hand related policy violation (e.g., car the user's hands on a phone, eating, drinking, smoking, or empty), and/or confidence level associated with the detected type of hand-related policy violation. For other policy violations associated with an object, metadata transmitted at block 216 may include the type of event (e.g., not wearing seatbelt violation) and number of times the driver was alerted of the policy violation previously.

If the vehicle device determines a safety event has been triggered, at block 214, the vehicle device may generate and/or provide an in-vehicle alert within the vehicle. Further, at block 216, based on identifying the occurrence of a safety event, the vehicle device may send metadata and limited asset data to the backend server system. The metadata and the limited asset data may include the sensor data associated with the event, the probability determined by the machine learning models of the vehicle device, and/or any other metadata associated with the event. The vehicle device may transmit the metadata and the limited asset data as event data 219. In some embodiments, the vehicle device may send metadata and limited asset data to the backend server system based on identifying the non-occurrence of a safety event. For example, the vehicle device may periodically or aperiodically send metadata and limited asset data to the backend server system regardless of whether an event has been identified in order to confirm that the vehicle device is correctly identifying events and correctly identifying non-events (e.g., the non-occurrence of events). Therefore, the vehicle device can send metadata and limited asset data to the backend server system if an event has been triggered or if an event has not been triggered.

Based on the vehicle device transmitting the event data 219 to the backend server system, the backend server system may obtain the event data 219. The backend server system may store the obtained event data 219. Further, at block 210, the backend server system can execute (e.g., implement) high-fidelity event detection models (e.g., one or more machine learning models) based on providing the obtained event data 219 as input to the high-fidelity event detection models. The backend server system can implement the one or more machine learning models to determine whether the machine learning models implemented by the vehicle device are correctly identifying events. Therefore, the vehicle device and the backend server system can execute the one or more machine learning models to identify events.

Example Machine Learning Models

As discussed above, the vehicle device (e.g., a vehicle gateway device) may implement a machine learning model to determine whether particular features that may be indicative of an event (e.g., a distracted state of a user of a vehicle), are included in the sensor data. The machine learning model may include one or more of a multi-modal machine learning model, a modular machine learning model, an ensemble machine learning model, and/or a stateful machine learning model. Further, the machine learning model can implement a plurality of machine learning models (e.g., a plurality of layered machine learning models). For example, the machine learning model may include a plurality of machine learning models that are organized into different hierarchical layers of the machine learning model. The machine learning model can take, as inputs, data from multiple modalities or sensors (e.g., when implemented as a multi-modal machine learning model). Further, the machine learning model can include multiple layers of machine learning models that can be independently tuned or trained (e.g., when implemented as a modular machine learning model). The machine learning model can use the output of the multiple layers of machine learning models to determine an output (e.g., when implemented as an ensemble machine learning model). Further, the machine learning model can store the output in a stateful manner (e.g., when implemented as a stateful machine learning model).

When implemented as a multi-modal machine learning model, the machine learning model can obtain input data (e.g., sensor data) from multiple data sources associated with the vehicle device. For example, the machine learning model can obtain input data associated with a camera sensor, an accelerometer, a location detection sensor (e.g., a GPS sensor), and/or any other sensor. The machine learning model can obtain the input data from the multiple data sources and utilize the input data to generate an output for the multi-modal machine learning model. By obtaining input data from multiple data sources, the machine learning model can more accurately identify particular events than by obtaining input data from a single data source.

When implemented as a modular machine learning model, the machine learning model can be segmented or decomposed into a layered architecture. Further, the machine learning model can be segmented into a plurality of layers that are each independently tunable or trainable. In some embodiments, to determine how to segment the machine learning model, the vehicle device can obtain metadata associated with a user of the vehicle, the vehicle, the vehicle device, etc. Based on the metadata, the vehicle device may determine that a particular portion of the machine learning model may be tuned more often than another other portions of the machine learning model and/or that certain models (e.g., a head pose determination model) are replaced with other models (e.g., a head pose determination model specifically for bearded faces that is selected upon detection of a bearded face driver). The vehicle device and/or backend server system can segment the machine learning model such that the portion of the machine learning model that requires more frequent training can be trained without training the other portions of the machine learning model. By segmenting the machine learning model for independent training of thin layer, the machine learning model can more accurately and more efficiently train layers of the machine learning model.

When implemented as an ensemble machine learning model, the machine learning model can aggregate (e.g., pool together) outputs from multiple machine learning models. For example, the machine learning model can aggregate the output from multiple machine learning models to determine whether a user of a vehicle is distracted. The output of the machine learning models can be aggregated in a layered and/or hierarchical manner. For example, the output of a first machine learning model and a second machine learning model can be provided to and/or aggregated by a third machine learning model, the output of a fourth machine learning model and a fifth machine learning model can be provided to and/or aggregated by a sixth machine learning model, and the output of the third machine learning model and the output of the sixth machine learning model can be provided to and/or aggregated by a seventh machine learning model, which may output an indication of a likelihood of particular features and/or a particular event. By aggregating the output of multiple machine learning models, the machine learning model can more accurately identify particular features and/or particular events based on sensor data.

When implemented as a stateful machine learning model, the machine learning model can store an output for each frame of sensor data in order to make determinations of the occurrence of a particular feature and/or a particular event. Further, the machine learning model can determine an output for a particular frame of sensor data. The machine learning model can store a plurality of determinations for a sequences of frames of the sensor data. Based on the plurality of determinations, the machine learning model can make inferences on the start time and/or end time for a particular feature and/or a particular event. For example, the machine learning model can make inferences and output inferences indicating the start time and the end time of the distraction of a user of vehicle. By providing stateful information associated with the features and/or the events, the machine learning model can provide greater insight into the particular features and/or events than traditionally provided.

Example Modular Machine Learning Model

Figure 3:
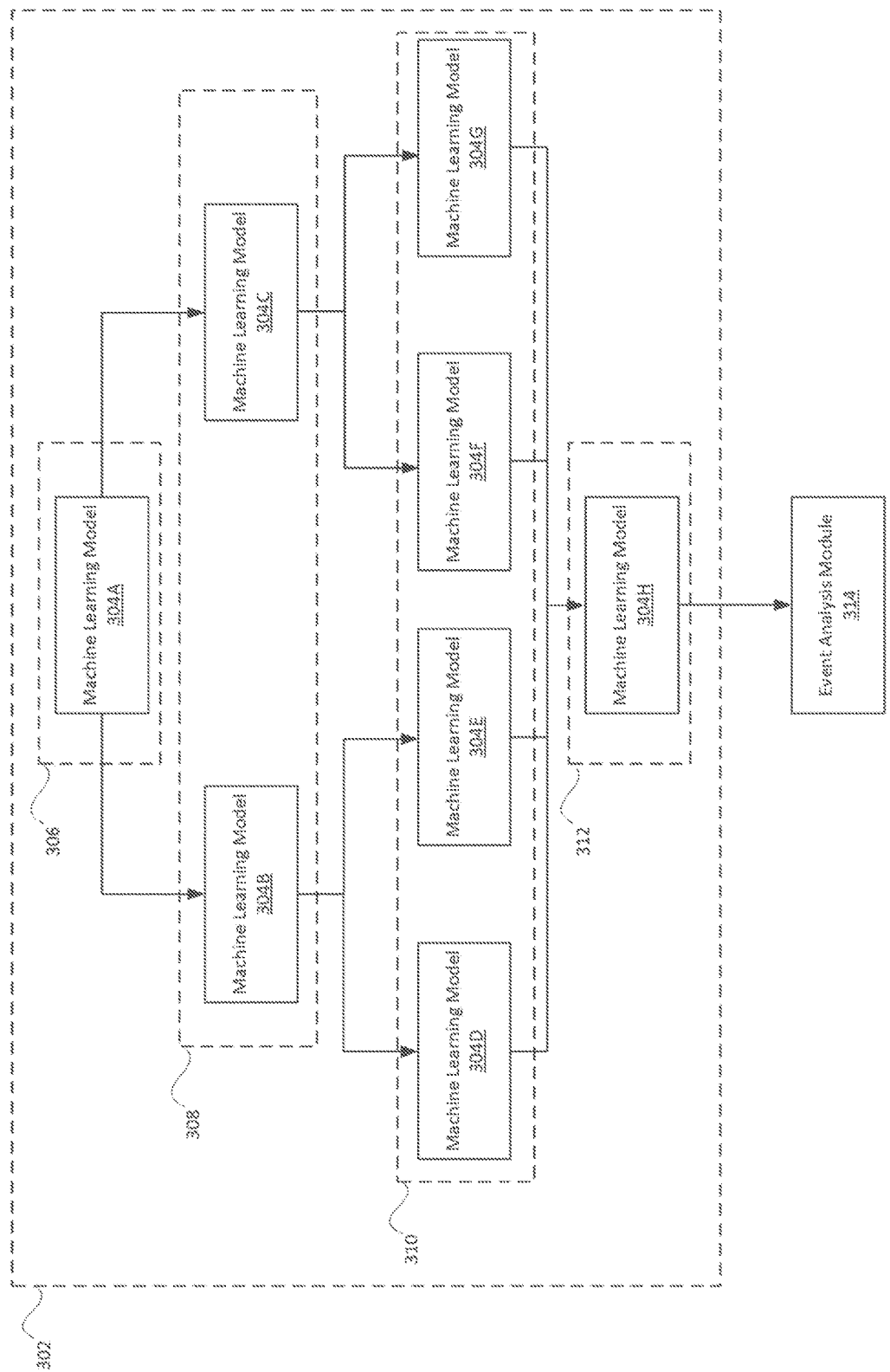
FIG. 3 is a pictorial diagram illustrating a modular machine learning model.

FIG. 3 is a pictorial diagram illustrating a modular (e.g., layered) machine learning model. The modular machine learning model may be implemented by a vehicle device. For example, the vehicle device can implement the modular machine learning model in order to identify a particular event such as the distracted state of a user of vehicle. In general, the vehicle device can implement the modular machine learning model 302 and the event analysis module 314. Depending on the embodiment, however, the modular machine learning model 302 and/or the event analysis module 314 may be implemented by different devices than illustrated and/or the vehicle device may implement more, less, or different components.

The modular machine learning model 302 may be segmented into a plurality of layers. The vehicle device may identify metadata associated with a vehicle, a vehicle device, a user of the vehicle, etc. and segment the modular machine learning model 302 into the plurality of layers based on the identified metadata. By segmenting the modular machine learning model 302 based on the metadata, the modular machine learning model 302 can be segmented into thin layers that are configured for a particular user, a particular vehicle, a particular vehicle device, etc. This can enable the segmentation of thin layers for independent tuning that are customizable for each vehicle device, each machine learning model, etc.

The modular machine learning model 302 can include a plurality of layers of machine learning models. Each layer of the modular machine learning model 302 can be segmented to include one or more machine learning models (e.g., one or more sub-machine learning models). In the example of FIG. 3, the modular machine learning model includes a first layer 306, a second layer 308, a third layer 310, and a fourth layer 312. Further, the first layer 306 include machine learning model 304A, the second layer 308 includes machine learning model 304B and machine learning model 304C, the third layer 310 include machine learning model 304D, machine learning model 304E, machine learning model 304F, and machine learning model 304G, and the fourth layer includes machine learning model 304H. The modular machine learning model 302 may include more, less, or different layers of machine learning models and each layer of the modular machine learning model 302 may include more, less, or different machine learning models. For example, the first layer 306 and the second layer 308 can be combined into a single layer and/or the third layer 310 can be segmented into multiple, distinct layers (e.g., a fifth layer containing machine learning model 304D, a sixth layer containing machine learning model 304E, and a seventh layer containing machine learning model 304F and 304G).

The first layer 306 of the modular machine learning model 302 can receive the input (e.g., sensor data). The first layer 306 can provide the input to machine learning model 304A and perform one or more operations on the input to generate a first output. The first layer 306 can provide the first output to the second layer 308 of the modular machine learning model 302. The second layer 308 can provide the input to a machine learning model 304B and a machine learning model 304C to generate a second output and a third output. The second layer 308 can provide the second output and the third output to the third layer 310 of the modular machine learning model 302. The third layer 310 can provide the second input to machine learning model 304D and machine learning model 304E and the third input to machine learning model 304F and machine learning model 304G to generate a fourth output, a fifth output, a sixth output, and a seventh output. The third layer 310 can provide the fourth output, the fifth output, the sixth output, and the seventh output to the fourth layer 312 of the modular machine learning model 302. The fourth layer 312 can provide the fourth output, the fifth output, the sixth output, and the seventh output to machine learning model 304H. The machine learning model 304H can aggregate (e.g., pool together) each of the fourth output, the fifth output, the sixth output, and the seventh output to generate a final output based the output of each individual layer of machine learning models. Further, the modular machine learning model 302 can provide the final output as a probability of an occurrence of a particular event for a particular frame of sensor data to the event analysis module 314.

The event analysis module 314 can receive the final output from the modular machine learning model 302 and determine whether the event has occurred (e.g., whether an event has occurred). In order to determine whether the event has occurred, the event analysis module 314 can compare the final output to an event threshold or a probability threshold (e.g., 70%). Further, the event analysis module may determine an event schedule (e.g., a schedule for identifying events) and determine whether the sensor data should be analyzed based on the sensor data. The event analysis module 314 may identify, based on the final output from the modular machine learning model 302, the event threshold, and/or the event schedule) whether an event has occurred and provide an output (e.g., an output for a user computing device) indicating whether the event occurred. Therefore, the event analysis module 314 can generate an event prediction based on the final output from the modular machine learning model 302.

Example Embodiments of Segmenting a Machine Learning Model

Figure 4:
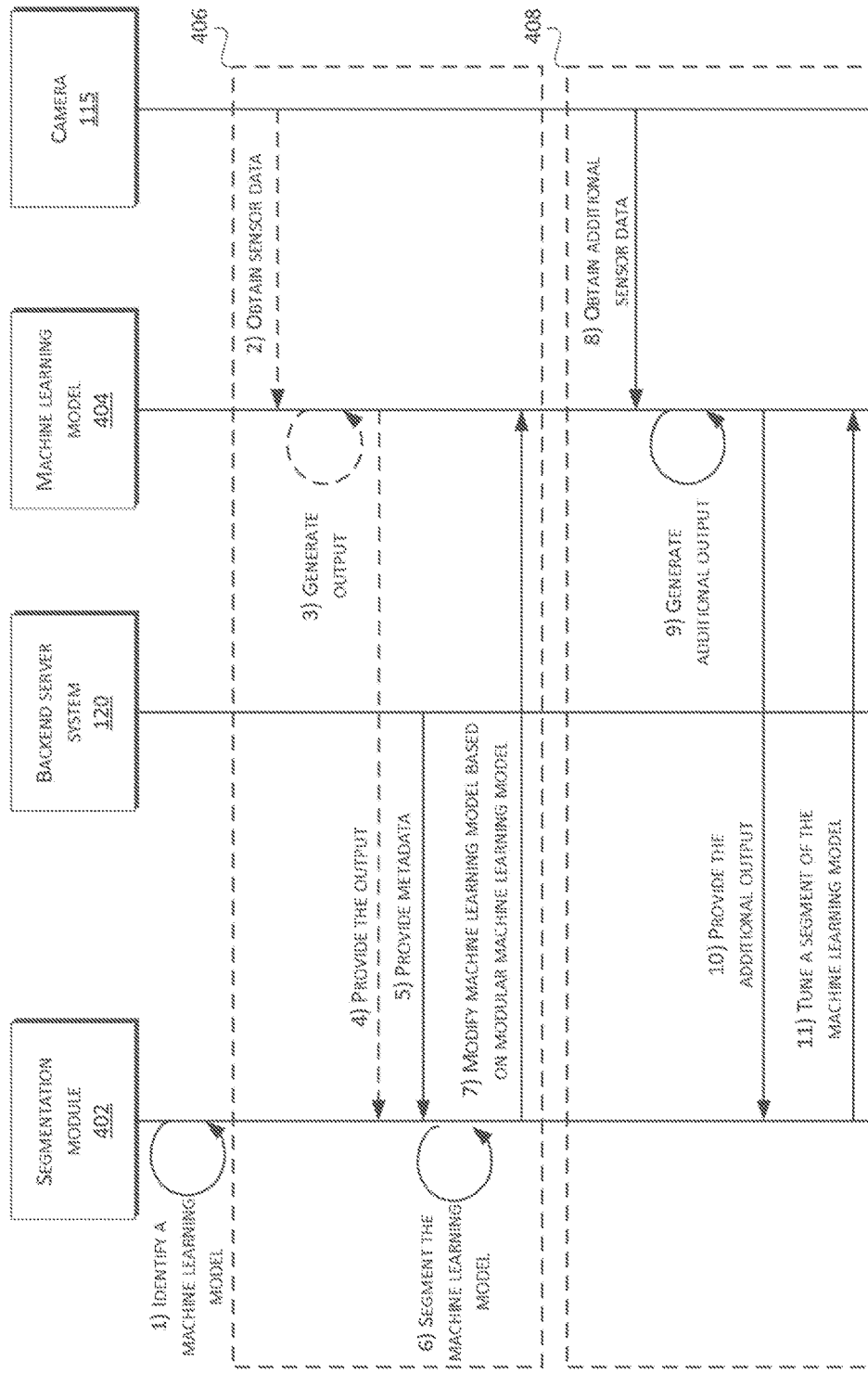
FIG. 4 illustrates a flow diagram for tuning a particular model of a modular neural network.

FIG. 4 depicts interactions among various components shown in FIG. 1A and 1B for segmenting a machine learning model based on metadata in accordance with aspects of the present disclosure. The environment 400 may include various components implemented in a configuration as identified in FIG. 1A and FIG. 1B. The environment 400 may include a segmentation module 402, a backend server system 120, a machine learning model 404, and a camera 115. The segmentation module 402 and/or the machine learning model 404 may be implemented by the vehicle device. In some embodiments, the segmentation module 402 and the machine learning model 404 may be implemented by a different device or system. For example, the segmentation module 402 may be implemented by the backend server system 120. Further, the environment 400 can include one or more additional sensors. In some embodiments, the camera 115 may be replaced by a different sensor such as an accelerometer. The environment 400 may include more, less, or different components.

As shown in FIG. 4 at [1], the segmentation module 402 may identify a machine learning model 404. The segmentation module 402 may identify a machine learning that is associated with a particular vehicle device. Further, the segmentation module 402 may identify a machine learning model 404 that is implemented by a particular vehicle device. In some embodiments, the vehicle device may provide the segmentation module 402 with an identifier or other information associated with the machine learning model 404. For example, the vehicle device may indicate whether the machine learning model 404 is segmented, identify any layers of the machine learning model 404, etc.

In some embodiments, at [2], the machine learning model 404 can obtain the sensor data from the camera 115. The sensor data can include sensor data obtained by the camera 115. For example, the sensor data can include sensor data capturing an image of a scene (e.g., an image of a user of a vehicle). Further, the sensor data can include sensor data associated with a particular frame. In some embodiments, the machine learning model 404 can obtain sensor data from one or more additional sensors (e.g., a gyroscope, an accelerometer, a location detection sensor, an audio sensor, a video sensor, etc.) in addition to or in lieu of the sensor data obtained from the camera 115. Further, the machine learning model 404 can obtain sensor data from multiple sensors (e.g., a camera and an accelerometer). The machine learning model 404 can obtain streaming sensor data or batch sensor data. Therefore, the machine learning model 404 can obtain the sensor data from the camera 115.

In some embodiments, at [3], the machine learning model 404 can generate the output based on the obtained sensor data. The machine learning model 404 may implement one or more machine learning models in order to detect the probability of an occurrence of a particular event (e.g., a distracted state) based on a probability of features (e.g., hand actions, gaze, head pose, etc.) associated with an object (e.g., a user of a vehicle) based on the sensor data (e.g., camera sensor data). The vehicle device may implement the machine learning model 404 by providing the sensor data as input. Based on the provided sensor data, the machine learning model 404 can determine the first probability of the event. The probability of the event may identify a first probability that an event has occurred based on the sensor data. Therefore, the machine learning model 404 can generate an output identifying a probability of an occurrence of a particular event.

In some embodiments, at [4], the machine learning model 404 can provide the output to the segmentation module 402 of the vehicle device. In some embodiments, the machine learning model 404 may provide a probability of an event based on each set of sensor data received from the machine learning model 404. Further, the machine learning model 404 may periodically or aperiodically provide a probability of the event to the segmentation module 402. The machine learning model 404 may provide the output to the segmentation module 402 for tuning of a particular portion of the machine learning model 404. Therefore, the machine learning model 404 can provide the probability to the segmentation module 402. In some embodiments, steps [2]-[4] may not be performed and the machine learning model 404 may not generate an output based on the sensor data and provide the output to the segmentation module prior to the segmentation of the machine learning model 404.

At [5], the backend server system 120 provides metadata to the segmentation module 402. The metadata may be metadata identifying particular statistics associated with the vehicle device, a vehicle associated with the vehicle device, a user associated with the vehicle device, an organization associated with the vehicle, etc. The metadata may identify particular portions of the machine learning model 404 that are often retrained or tuned (e.g., that have been historically tuned more often than other portions of the machine learning model 404). Further, the segmentation module may compare the metadata with known characteristics of the vehicle device, the vehicle, a user of the vehicle, etc. For example, the metadata may identify that a face and hand detection portion of the machine learning model 404 are more often tuned than other portions of the machine learning model 404 for users with facial hair. Based on determining that the user of the vehicle has facial hair, the segmentation module 402 may identify that the face and hand detection portion, a face detection portion, a lower face detection portion, etc. of the machine learning model 404 is more likely to require frequent tuning. In some embodiments, another computing system (e.g., a user computing device of a user of the vehicle, the vehicle device, a separate computing system, etc.) may provide the metadata to the segmentation module. Therefore, the backend server system 120 provides the metadata to the segmentation module.

At [6], the segmentation module 402 can segment the machine learning model 404 based on the obtained metadata to identify a modular machine learning model. Based on comparing the metadata with characteristics of the user, the vehicle, the vehicle device, etc., the segmentation module 402 may identify particular portions of the machine learning model (e.g., a face and hand detection portion of the machine learning model). The segmentation module 402 may further segment the machine learning model such that the particular portions of the machine learning are segmented into individual layers of the machine learning model. Each layer of the modular machine learning model may be independently tuned and/or trained to enable the rapid and efficient training of the layers of the modular machine learning model. Therefore, the segmentation module 402 can segment the machine learning model 404 based on the obtained metadata.

At [7], the segmentation module 402 may modify the machine learning model 404 based on the modular machine learning model. For example, the segmentation module 402 can identify how to modify the machine learning model 404 based on the modular machine learning model. Further, the segmentation module 402 may then modify the machine learning model 404 to form the modular machine learning model. In some embodiments, the segmentation module 402 may implement a new machine learning model based on the modular machine learning model. In other embodiments, the segmentation module 402 may modify the previously implemented machine learning model 404 to implement the modular machine learning model. Therefore, the segmentation module 402 may modify the machine learning model 404 based on the identified modular machine learning model.

In some embodiments, steps [2]-[7] may be implemented in multiple iterations. Further, steps [2]-[7] may be implemented separately as process 406. For example, the segmentation module 402 may periodically or aperiodically receive metadata and update the machine learning model 404 based on an updated segmentation of the modular machine learning model.

At [8], the machine learning model 404 can obtain additional sensor data from the camera 115. The additional sensor data can include sensor data obtained by the camera 115. For example, the sensor data can include sensor data capturing an updated or additional image of the scene (e.g., an image of a user of a vehicle). Further, the sensor data can include sensor data associated with a subsequent frame. For example, the sensor data obtained at [2] may be associated with a first frame and the sensor data obtained at [8] may be associated with a second frame. Therefore, the machine learning model 404 can obtain the additional sensor data from the camera 115.

At [9], the machine learning model 404 can generate the additional output based on the obtained sensor data. As discussed above, the machine learning model 404 may be a modular machine learning model based on the segmentation of the machine learning model 404 by the segmentation module 402. Based on the provided additional sensor data, the machine learning model 404 can a second probability of the event. The probability of the event may identify a second probability that an event has occurred based on the additional sensor data. Therefore, the machine learning model 404 can generate an additional output identifying a probability of an occurrence of a particular event.

At [10], the machine learning model 404 can provide the additional output to the segmentation module 402 of the vehicle device. In some embodiments, the machine learning model 404 may provide a probability for each set of additional sensor data received from the machine learning model 404. Therefore, the machine learning model 404 can provide the probability to the segmentation module 402. In some embodiments, the machine learning model 404 may provide the additional output to a separate system such as the backend server system 120.

At [11], the segmentation module 402 can tune a segment of the machine learning model 404. The segmentation module 402 may identify that a particular segment (e.g., portion) of the machine learning model 404 (as segmented by the segmentation module 402) should be tuned based on the additional output provided by the machine learning model 404. In order to tune the machine learning model 404, the segmentation module 402 may retrain the machine learning model 404 and/or adjust or tune particular parameters of the machine learning model (e.g., the machine learning model may be implemented based on particular parameters and the segmentation module 402 may tune or adjust these parameters). Prior to tuning the segment of the machine learning model 404, a separate system may determine to tune the segment of the machine learning model 404. For example, the backend server system 120 may implement a separate machine learning model based on the sensor data and identify differences between the output of the machine learning model implemented by the backend server system 120 and the output of the machine learning model 404. Based on the differences, the backend server system 120 may identify the segment of the machine learning model 404 and provide a request to the vehicle device (e.g., the segmentation module 402 of the vehicle device) for training of the particular segment of the machine learning model 404. Therefore, the segmentation module 402 can tune the segment of the machine learning model 404.

In some embodiments, steps [8]-[11] may be implemented in multiple
iterations. Further, steps [8]-[11] may be implemented separately as process 408. For example, the segmentation module 402 may periodically or aperiodically additional output from a modular machine learning model and tune a particular segment of the modular machine learning model based on the output of the modular machine learning model.

Ensemble Machine Learning Model

Figure 5:
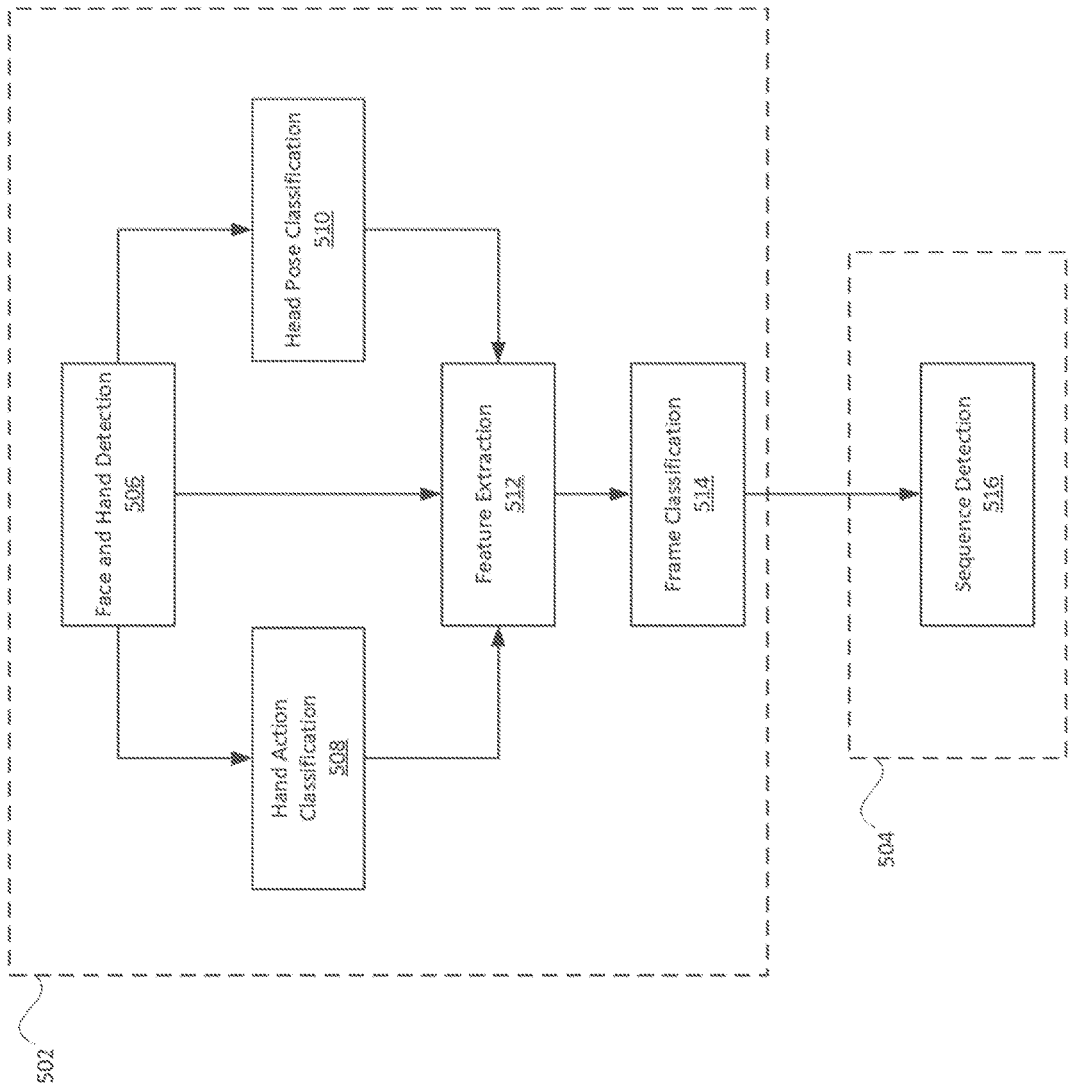
FIG. 5 is a flow diagram illustrating an example process for detection of a distracted state of a vehicle user.

FIG. 5 is a pictorial diagram illustrating an ensemble machine learning model. The ensemble machine learning model may be implemented by a vehicle device. For example, the vehicle device can implement the ensemble machine learning model in order to identify a particular event such as the distracted state of a user of vehicle based on the output of multiple machine learning models (e.g., multiple layers of machine learning models). Further, the ensemble machine learning model may also be a stateful machine learning model. In general, the vehicle device can implement the ensemble machine learning model 502 and the sequence detection layer 504. Depending on the embodiment, however, the ensemble machine learning model 502 and/or the sequence detection layer 504 may be implemented by different devices than illustrated and/or the vehicle device may implement more, less, or different components.

The ensemble machine learning model 502 may include one or more machine learning models for detection of particular features based on obtained sensor data. The features may be aggregated or pooled together to identify a probability of an occurrence of a particular event within an image (e.g., a probability that a user of vehicle is distracted). In the example of FIG. 5, the ensemble machine learning model 502 may include a face and hand detection model 506, a hand action classification model 508, a head pose classification model 510, a feature extraction model 512, and a frame classification model 514 for generating an output and providing the output to a sequence detection layer 504. The sequence detection layer 504 may include a sequence detection model 516. Depending on the embodiment, an ensemble machine learning model 502 and/or the sequence detection layer 504 may include more, less, or different components or models than the examples discussed herein. Further, the ensemble machine learning model 502 may be a frame classifier pipeline and the sequence detection layer 504 may be a sequence detector pipeline.

The face and hand detection model 506 may be implemented as a single face and hand detection model 506 or as separate face detection model and a hand detection model. The face and hand detection model 506 may be implemented to identify a face and/or one or more hands of a user of a vehicle. Further, the face and hand detection model 506 may be an upstream machine learning model that detects a face and/or a hand of a user of the vehicle at a single frame level. The face and hand detection model 506 may be an object detector model that is trained to identify human hands and/or human faces. The face and hand detection model 506 may be trained to identify human hands and/or human faces based on received sensor data. For example, the face and hand detection model 506 may be trained to identify human hands and/or human faces on sensor data obtained from cm3x inward facing camera. Based on the obtained sensor data, the face and hand detection model 506 may produce one or more hand bounding boxes identifying one or more hands of the user of the vehicle and/or one or more face bounding boxes identifying a face of the user of the vehicle. Further, the face and hand detection model 506 may also identify a probability for each set of bounding boxes indicating a probability that the bounding boxes identify the face and/or hand of the user of the vehicle. Therefore, the face and hand detection model 506 may be implemented to detect a face and/or at least one hand of a user of the vehicle.

The hand action classification model 508 may be implemented to identify and/or track a hand action of the user of the vehicle. Further, the hand action classification model 508 may be implemented to track particular biomechanical actions of the user of the vehicle. For example, the hand action classification model 508 may be implemented to track and detect particular biomechanical hand actions of the user of the vehicle as captured by the sensor data. Further, the hand action classification model 508 may be an upstream machine learning model that detect hand actions of the user of the vehicle at a single frame level. The hand action classification model 508 may receive as input the set of bounding boxes produced by the face and hand detection model 506 identifying one or more hands of the user of the vehicle (e.g., a 128x128x128x3 RGB image). The hand action classification model 508 may pool (e.g., average) the inputs and pass the pooled inputs to a dense layer that produces a plurality of outputs (e.g., four outputs). The plurality of outputs may include one or more probabilities that the set of hand bounding box coordinates identify a particular hand action (e.g., the action of a hand holding food, the action of a hand holding a drink, the action of a hand holding a phone, the action of a hand touching a face of the user, the action of a hand in a neutral position, the action of a hand interacting with the vehicle, etc.). The plurality of outputs may also include a probability that the set of hand bounding box coordinates do not identify a hand. Therefore, the hand action classification model 508 may identify a hand action of the user of the vehicle.

The head pose classification model 510 may be implemented to identify and/or track a head pose of the user of the vehicle. For example, the head pose classification model 510 may output an Euler angle corresponding to a particular head pose angle and corresponding to a particular probability. Further, the head pose classification model 510 may be an upstream model to detect a head pose angle of a user of the vehicle at a single frame level. The head pose classification model 510 may receive as input the set of bounding boxes produced by the face and hand detection model 506 identifying a face of the user of the vehicle (e.g., a 128x128x128x3 RGB image). The head pose classification model 510 may generate a dimensional embedding (e.g., a 66 dimensional embedding) and produce a set of Euler angles based on the dimensional embedding representing the head pose of the user of the vehicle and a probability or confidence that the set of Euler angles identify the head pose of the user. The set of Euler angles may include a pitch, yaw, and/or roll. Further, the head pose classification model 510 may be trained to produce a set of angles based on a set of bounding boxes identifying a face of the user of the vehicle.

In some embodiments, the ensemble machine learning model 502 may also include a gaze angle classification model. The gaze angle classification model may be implemented to identify and/or track a gaze pose of the user of the vehicle. The gaze angle classification model may receive the output of the face and hand detection model 506 as input and produce a probability of a particular gaze pose of the user of the vehicle as an output. In some embodiments, the gaze angle classification model may produce multiple outputs, each output representing a probability of a particular gaze angle. For example, the gaze angle classification model may an Euler angle corresponding to the gaze angle. In some embodiments, the ensemble machine learning model 502 may include a joint gaze angle and head pose classification model. Further, the gaze pose classification model may be an upstream model to detect a gaze pose of a user of the vehicle at a single frame level.

A feature extraction model 512 may receive the inputs from the upstream machine learning models (e.g., the face and hand detection model 506, the hand action classification model 508, the head pose classification model 510, the gaze angle classification model, etc.) and extract particular features from the inputs to produce a numerical array with one or more values. For example, the feature extraction model 512 can receive the inputs and add features corresponding to proximity and/or overlap of the hand and the face of the user. Further, the numerical array may identify a probability of an event (e.g., a probability of distraction of the user of the vehicle) based on the features (e.g., the face bounding box coordinates, the probability that the face bounding box coordinates identify the face of the user of the vehicle, the hand bounding box coordinates, the probability that the hand bounding box coordinates identify the hand of the user of the vehicle, an overlap between the hand bounding box coordinates and the face bounding box coordinates, a distance between the hand bounding box coordinates and the face bounding box coordinates, the angular distance between the corner of an image represented by the sensor data and the face bounding box coordinates, the angular distance between the corner of the image and the hand bounding box coordinates, the head pose angles, the probability or confidence that the head pose angles identify the head pose of the user, the hand action classification, the probability or confidence that the hand action classification identifies the hand action of the user, the gaze classification, and/or any other features).

Further, the frame classification model 514 can receive the numerical array from the feature extraction model 512 and predict the probability of distraction based on the numerical array. The frame classification model 514 may be implemented by the vehicle device and may receive the output of the feature extraction model 512. Based on the obtained output, the frame classification model 514 may pool the outputs to generate an output identifying a probability of distraction for the user of the vehicle for a particular frame. The frame classification model 514 may be a mid-ware machine learning model to identify a potential distraction of the user of the vehicle based on the output of one or more upstream machine learning models at a single frame level.

The frame classification model 514 may be trained (e.g., using a contrastive learning procedure) to identify the distracted state of the user of the vehicle. For example, the frame classification model 514 can be trained using a pair of frames at a time by contrasting the state of the user of the vehicle in each frame. Therefore, the frame classification model 514 can generate an output identifying a probability of distraction for the user of the vehicle based on output of the upstream machine learning models.

The sequence detection layer 504 may implement the sequence detection model 516 in order to enable the ensemble machine learning model 502 to be a stateful, ensemble machine learning model. The sequence detection model 516 may implement an algorithm to predict the start time and/or end time of distraction of a user of a vehicle based on the output of the frame classification model 514. In some embodiments, the sequence detection model 516 may be a machine learning model. Therefore, the sequence detection model 516 may obtain, as input, outputs from the frame classification model representing a probability of distraction for the user of the vehicle for each frame of sensor data. The sequence detection model 516 may aggregate the results from the ensemble machine learning model 502 in order to determine a predicted start time and/or a predicated end time of the distraction of the user. Further, the sequence detection model 516 may identify and/or predict a distraction interval for the user. For example, the sequence detection model 516 may indicate a start time and an end time for a particular user based on receiving input identifying the user was distracted in a particular frame. The sequence detection model 516 may be implemented by the vehicle device on the edge as an edge model by the vehicle device. Further, the sequence detection layer 504 may include the segmentation module 402 as discussed above in order to calibrate the ensemble machine learning model 502 at a vehicle level, a user level, a vehicle device level, etc. to enable independent training and/or tuning of thin layers of the ensemble machine learning model 502. Therefore, the sequence detection model 516 may identify a start time and/or end time for the distraction of the user of the vehicle.

Example Operating Diagrams of the Ensemble Machine Learning Model

Figure 6A:
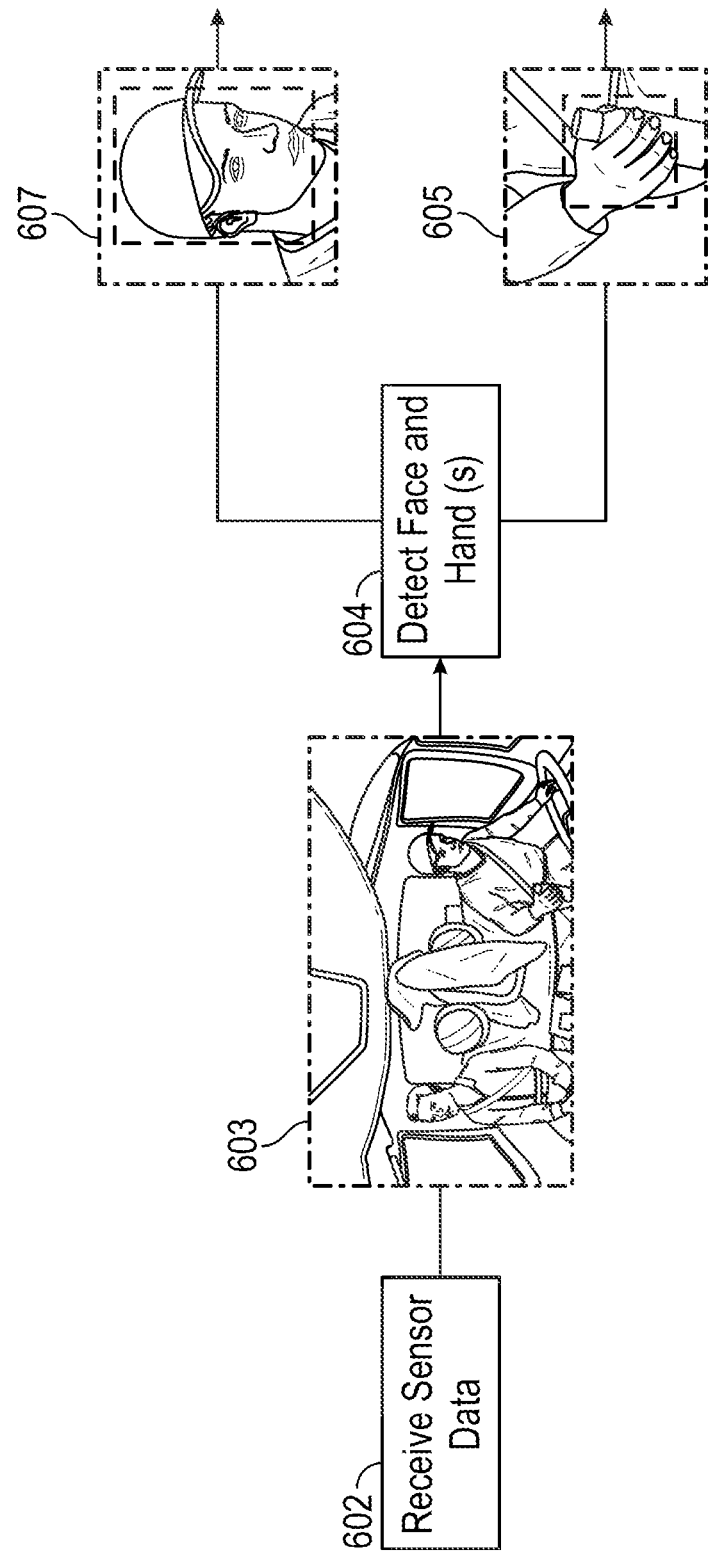
FIG. 6A is a flow diagram illustrating an example process for detection of a face and a hand of a vehicle user.
Figure 6B:
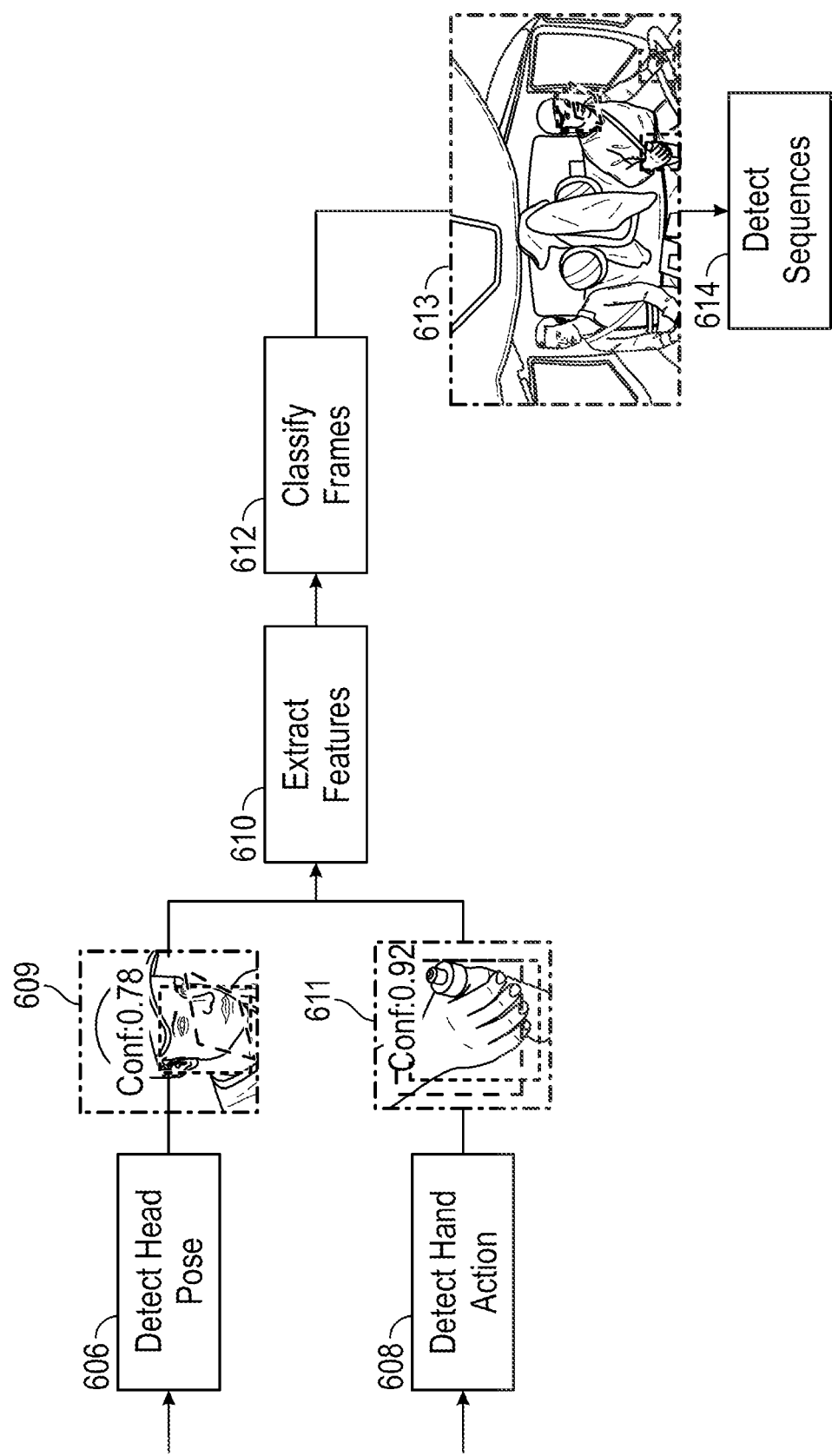
FIG. 6B is a flow diagram illustrating an example process for detecting sequences of events.

FIGS. 6A and 6B are operation diagrams illustrating an example data flow for implementing an ensemble machine learning model. Specifically, FIGS. 6A and 6B are operation diagrams illustrating a data flow for receiving a camera data (e.g., sensor data from a camera associated with a vehicle device) and identifying a probability of an occurrence of a particular event (e.g., a probability of a distracted state for the user of the vehicle). Any component of the vehicle device can facilitate the data flow for implementing the ensemble machine learning model. In some embodiments, a component of a separate event analysis system can facilitate the data flow. In the example of FIGS. 6A and 6B, the vehicle device facilitates the data flow.

At step 602, the vehicle device obtains sensor data (e.g., image data) associated with a camera image 603. In some embodiments, sensor data from multiple imaging device and/or other types of sensors may be accessed. In the example of FIGS. 6A and 6B, a camera image 603 is used, however, different types of images or sensor data can be used. In some embodiments, the vehicle device may obtain the sensor data and/or an image from a database. The vehicle device may pass the sensor data to an ensemble machine learning model implemented by the vehicle device in order to identify a probability that the user of the vehicle is distracted.

At step 604, the vehicle device detects a face and one or more hands of a user of the vehicle. In order to detect the face and one or more hands of the user of the vehicle, the vehicle device may implement a face and hand detection model within the ensemble machine learning model. The face and hand detection model may be trained to identify the face and/or hand(s) of a user of the vehicle. Further, the face and hand detection model may be trained to identify a set of bounding box coordinates that identify the face of the user of the vehicle and one or more sets of bounding boxes that identify one or more hands of the user of the vehicle. The face and hand detection model may output each set of bounding box coordinates and a probability that the particular set of bounding box coordinates identifies the face and/or hand of the user of the vehicle.

The face and hand detection model may receive the sensor data from the sensor (e.g., from a camera). Further, the face and hand detection model can identify a set of face bounding box coordinates associated with a camera image 607 and one or more sets of hand bounding box coordinates associated with a camera image 605. Each of the camera image 607 and the camera image 605 may correspond to a portion of the camera image 603 and may identify the portion of the camera image 603 associated with the set of bounding box coordinates. In some embodiments, the face and hand detection model may output multiple sets of face bounding box coordinates associated with multiple camera images and/or multiple sets of hand bounding box coordinates associated with multiple camera images. Each set of bounding box coordinates may be associated with a particular probability (e.g., a confidence) indicating the likelihood that the bounding box coordinates accurately identify the face or hand of the user of the vehicle. The face and hand detection model may generate the probabilities based on the training of the face and hand detection model.

FIG. 6B is an operation diagram for detecting a duration of distraction using an ensemble machine learning model. The ensemble machine learning model may further include a head pose classification model and a hand action classification model. At step 606, the vehicle device detects a head pose of the user of the vehicle. In order to detect the head pose of the user of the vehicle, the vehicle device can implement the head pose classification model. The head pose classification model can be trained to identify a head pose of a user based on a set of face bounding box coordinates. The head pose classification model can receive as input an image and the set of face bounding box coordinates produced by the face and hand detection model for the particular image. Further, the head pose classification model can produce a vector of angles based on the set of face bounding box coordinates. For example, the head pose classification model may produce a vector of Euler angles that identifies the user's pose (e.g., pitch, yaw, and/or roll) in radians. The vehicle device may produce an image 609 associated with the vector identifying the head pose and a probability (e.g., confidence) that the identified head pose corresponds to the head pose of the user. In the example of FIG. 6B, the image 609 identifies the head pose and a confidence of 0.78 that the identified head pose is the head pose of the user (e.g., on a scale of 0 to 1 with 1 representing the highest confident score).

At step 608, the vehicle device detects one or more hand actions of the user of the vehicle. In order to detect the hand action of the user of the vehicle, the vehicle device can implement the hand action classification model. The hand action classification model can be trained to identify a hand action of a user based on a set of hand bounding box coordinates. The hand action classification model can receive as input an image and the set of hand bounding box coordinates produced by the face and hand detection model for the particular image. Further, the hand action classification model can produce a classification of the hand action for the particular image or frame. For example, the head pose classification model may identify a classification for the hand action of the user (e.g., from potential hand action classification of "not a hand," "hand (neutral)," "hand (mobile)," or "hand (food/drink)." The vehicle device may produce an image 611 associated with the vector identifying the hand action and a probability (e.g., confidence) that the identified hand action corresponds to the hand action of the user. In the example of FIG. 6B, the image 611 identifies the head pose and a confidence of 0.92 that the identified hand action is the hand action of the user (e.g., on a scale of 0 to 1 with 1 representing the highest confident score).

At step 610, the vehicle device extracts one or more features based on the detected head pose, the detected hand action, the face bounding box coordinates, the hand bounding box coordinates, and/or the sensor data. The vehicle device may receive the input from the upstream machine learning models and generate a numerical array by extracting particular features from the inputs. The numerical array generated by the vehicle device can include a numerical value for one or more features. For example, the numerical array can include a numerical value to identify an area, perimeter, diagonals, etc. of the face, a numerical value to identify a probability associated with the identified face, a numerical value to identify an area, perimeter, diagonals, etc. of the hands, a numerical value to identify a probability associated with the identified hand(s), a numerical value to identify overlap between one or more hands and a face, a numerical value to identify a distance between one or more hands and a face, a numerical value to identify an angular distance between the corner of the image 603 and the face or hand(s), a head pose, a head pose probability, a hand action, a hand action probability, and/or any other features.

At step 612, the vehicle device can classify the frames. In order to classify the frames, the vehicle device can implement a frame classification model within the ensemble machine learning model. The frame classification model can be trained to identify a probability of an event. The event may include a state of distraction of the user of the vehicle that is determined based on received input associated with a user of a vehicle. The frame classification model can receive the numerical array generated by the vehicle device and produce one or more probabilities identifying a probability of a distracted state of a user of a vehicle. The frame classification model may identify a probability of distraction for a particular frame (e.g., image 603). The frame classification model may further identify a vector of probabilities. For example, the vector of probabilities may include a probability of the user looking straight outside of the vehicle, a probability of the user looking in one or more directions outside of the vehicle, a probability of the user looking inside the vehicle in a distracted manner, etc. The vehicle device may analyze the image 603 to generate an analyzed image 613 associated with the classified frame. The vehicle device, via the analyzed image 613, may identify the probability of the event and/or particular features (e.g., the probability of the user looking straight outside of the vehicle, the probability of the user looking outside of the vehicle to the left, the probability of the user looking outside of the vehicle to the right, the probability of the user looking inside of the vehicle down, the confidence of the face detection, the confidence of the hand detection, the confidence of the gaze detection, the overlap between hands, the distance between hands, the probability of a user talking on a phone, the probability of a user eating food, the probability of a user holding the steering wheel with one or both hands, the probability of a particular gaze, etc.).

At step 614, based on the vector of probabilities, the vehicle device can further detect sequences. The vehicle device may determine a user is distracted based on a particular image and determine a start time and/or an end time for this distraction. In order to determine the start time and/or the end time, the vehicle device may analyze a plurality of images stored by the vehicle device and associated with the user of the vehicle. Based on this analysis, the vehicle device can identify timing information of the distraction. Further, the vehicle device can provide an indication of the distraction and/or the timing of the distraction to a user computing device, a backend server system, or any other computing system.

Example Method of Segmenting a Model for Thin Layer Tuning

Figure 7:
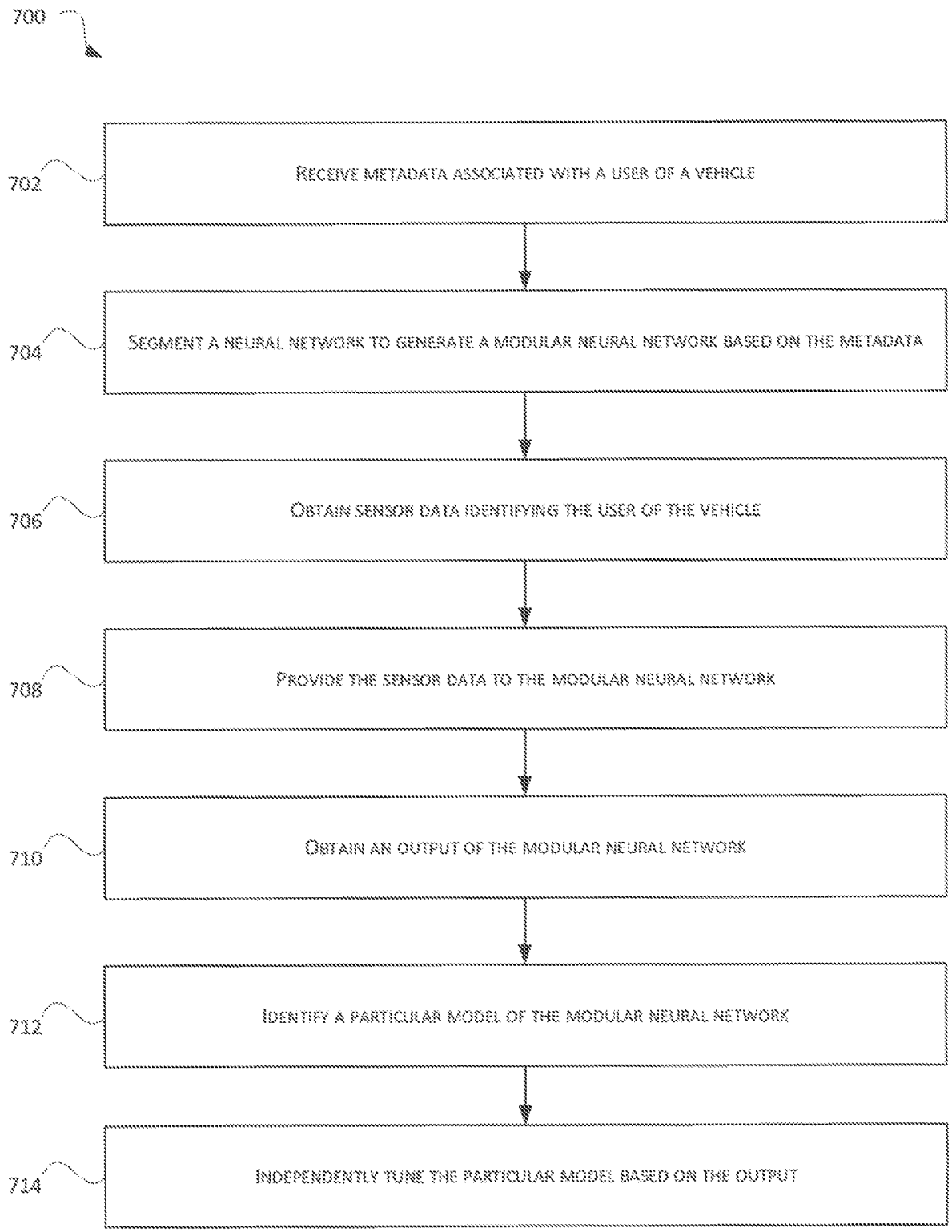
FIG. 7 illustrates an example method of independently tuning a particular model of a modular neural network, according to various embodiments of the present disclosure.

FIG. 7 illustrates an example method 700 of segmenting a machine learning model to generate a modular machine learning model to enable independent tuning of thin layers of the modular machine learning model, according to various embodiments described herein.

At block 702, the vehicle device (e.g., a gateway device, a vehicle gateway device, a gateway system, etc.) receives metadata associated with a user of a vehicle. The metadata may be specific to the user of the vehicle or specific to a plurality of users including the user. For example, the metadata may be associated with a particular user or with a group of users including users over the age of 50. In some embodiments, the metadata may be specific to the vehicle. For example, the metadata may be associated with a particular make and/or model of a vehicle. Further, the vehicle device may periodically update the metadata associated with the user of the vehicle.

At block 704, the vehicle device segments a neural network to generate a modular neural network (e.g., a modular machine learning model) based on the metadata. The modular neural network may include a plurality of machine learning models. Each of the plurality of machine learning models may be independently tunable and trainable to identify corresponding features. The plurality of the machine learning models may include face-hand detector (e.g., face and hand detection model), a hand action classifier (e.g., a hand action classification model), a head pose classifier (e.g., a head pose classification model), and/or a gaze detection classifier (e.g., a gaze classification model or a gaze detection model). The modular neural network may further include a plurality of layers and the plurality of machine learning models may be distributed across the plurality of layers. Further, the modular neural network may include a frame classifier pipeline (e.g., for identifying a probability of distraction for a particular frame) and/or a sequence detector pipeline (e.g., for identifying timing information for the distraction). In some embodiments, the vehicle device may train the neural network prior to or after segmentation.

At block 706, the vehicle device obtains sensor data identifying the user of the vehicle. Further, the sensor data may be associated with an image of a scene. Further, the vehicle device may obtain the sensor data from a plurality of sensors associated with the particular vehicle. The sensor data may include camera data, accelerometer data, location data, or any other data. Further, the vehicle device can obtain the sensor data from one or more sensors include a camera, an accelerometer, a location detection system, or any other sensor.

At block 708, the vehicle device provides the sensor data to the modular neural network. In some embodiments, the vehicle device may provide the sensor data as streaming sensor data. In other embodiments, the vehicle device may provide the sensor data as batch sensor data.

At block 710, the vehicle device obtains an output of the modular neural network. The output may include and/or identify a probability of an occurrence of a particular event associated with one or more objects in the image. The vehicle device may store the output of the modular neural network to generate stored output and obtain a subsequent output of the modular neural network. Further, the vehicle device can compare the subsequent output and the stored output to identify timing information (e.g., a start time and/or an end time) associated with an event (e.g., a distracted state of the user of the vehicle) based on comparing the stored output with the subsequent output. The vehicle device may also obtain the output at a frame by frame level. For example each output may correspond to a particular frame.

At block 712, the vehicle device identifies a particular model of the modular neural network. Further, the vehicle device may identify the particular machine learning model from the plurality of machine learning models associated with the modular neural network. In some embodiments, the particular machine learning model may include one or more of the frame classifier pipeline or the sequence detector pipeline. The vehicle device may identify the particular machine learning model based on identifying an error associated with the particular machine learning model. In some embodiments, the vehicle device may provide the output to a user computing device and obtain input from a user computing device based on the output. Further, the vehicle device can identify the particular machine learning model based on the input from the user computing device. In other embodiments, the vehicle device may identify the particular machine learning model based on input from a backend server system.

At block 714, the vehicle device independently tunes the particular model based on the output. Further, the vehicle device can independently train the particular machine learning model. The vehicle device may independently train the particular machine learning model subsequent to training the modular neural network. In some embodiments, the vehicle device may independently train the particular machine learning model without training at least one other machine learning model of the plurality of models subsequent tot raining the modular neural network.

Example Method of Implementing an Ensemble Model

Figure 8:
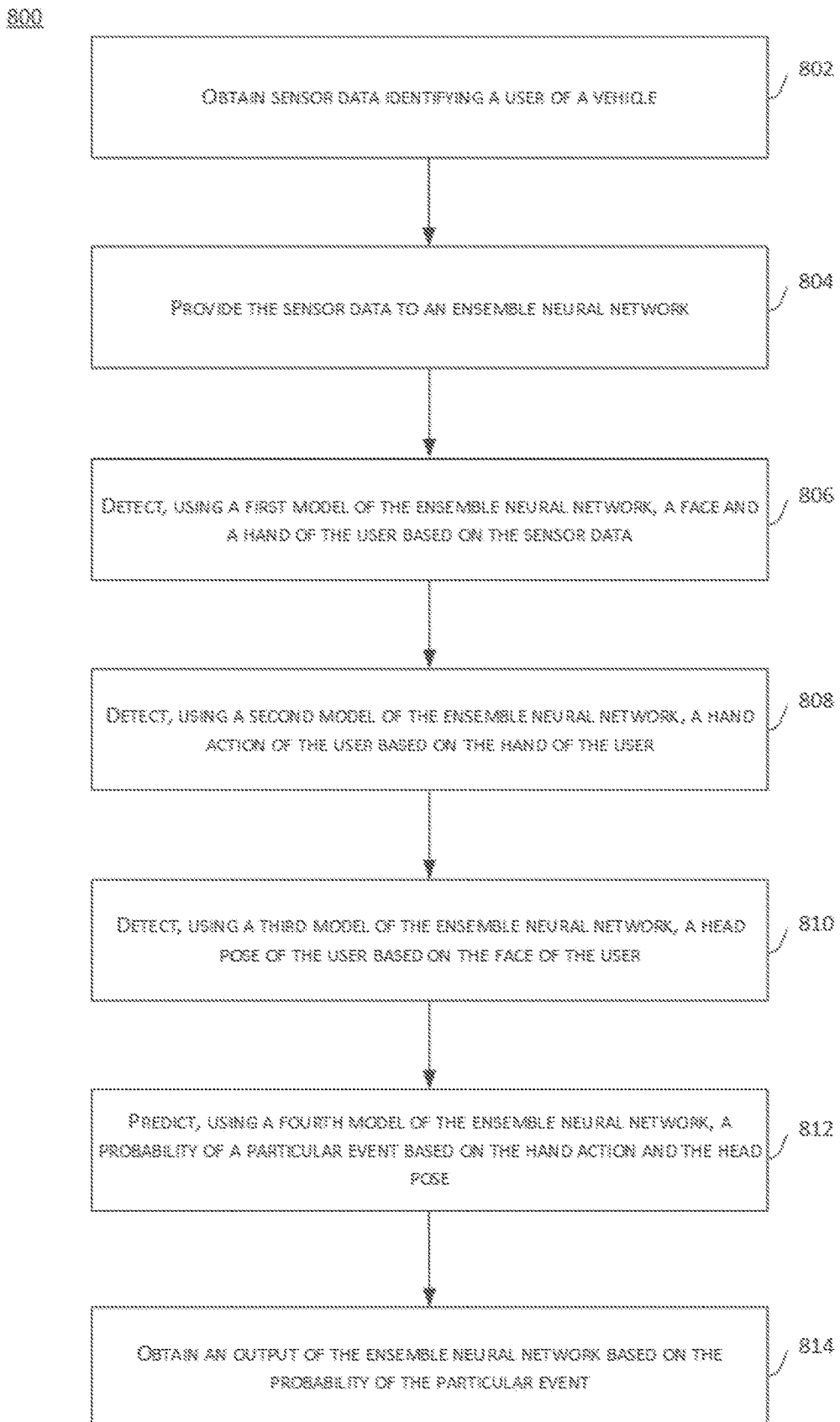
FIG. 8 illustrates an example method of deploying an ensemble neural network for detection of a distraction state of a vehicle user, according to various embodiments of the present disclosure.

FIG. 8 illustrates an example method 800 of implementing an ensemble machine learning model to identify a distracted state of a driver, according to various embodiments described herein.

At block 802, the vehicle device (e.g., a gateway device, a vehicle gateway device, a gateway system, etc.) obtains sensor data identifying a user of a vehicle and associated with an image of a scene. The sensor data may identify one or more objects of the image. In some embodiments, the sensor data may include streaming sensor data. In other embodiments, the sensor data may include batch sensor data. The vehicle device may obtain the sensor data from a plurality of sensors. Further, the sensor data may include camera data containing untranscoded images, accelerometer data, gyroscope information, location data, and/or any other sensor data.

At block 804, the vehicle device provides the sensor data to an ensemble neural network. The ensemble neural network may include a plurality of machine learning models. The ensemble neural network may further include a plurality of layers and the plurality of machine learning models may be distributed across the plurality of layers. In some embodiments, a first layer of the plurality of layers includes a first machine learning model and a second machine learning model and a second layer of the plurality of layers includes a third machine learning model. The ensemble neural network may further include a frame classifier pipeline and/or a sequence detector pipeline. The vehicle device may train the ensemble neural network. In some embodiments, the vehicle device may independently train and/or tune machine learning models of the ensemble neural network.

At block 806, the vehicle device detects, using a first model of the ensemble neural network, a face and a hand of the user based on the sensor data. The first machine learning model may include a face-hand detector (e.g., a face and hand detection model). The first machine learning model may detect the face by identifying one or more face bounding boxes and may detect at least one hand by identifying one or more hand bounding boxes.

At block 808, the vehicle device detects, using a second model of the ensemble neural network, a hand action of the user based on the hand of the user. The second machine learning model may include a hand action classifier (e.g., a hand action classification model). The hand action may include a neutral hand action, a hand interacting with a phone hand action, and/or a hand interacting with food hand action.

At block 810, the vehicle device detects, using a third model of the ensemble neural network, a head pose of the user based on the face of the user. The third machine learning model may include a head pose classifier (e.g., a head pose classification model). The third machine learning model may detect the head pose by detecting one or more of a yaw, a pitch, and/or a roll angle.

In some embodiments, the vehicle device may also detect, using a fifth model of the ensemble neural network, a gaze (e.g., an eye gaze angle) of the user based on the face of the user. The fifth machine learning model may include a gaze detection classifier (e.g., a gaze detection model or a gaze classification model).

At block 812, the vehicle device predicts, using a fourth model of the ensemble neural network, a probability of a particular event based on the hand action and the head pose. In some embodiments, the vehicle device may predict the probability of the particular event further based on gaze of the user. The fourth machine learning model may predict the probability of the event by aggregating an output of the first machine learning model, an output of the second machine learning model, and/or an output of the third machine learning model.

At block 814, the vehicle device obtains an output of the ensemble neural network based on the probability of the particular event. The vehicle device may store the output of the ensemble neural network to generate stored output and obtain a subsequent output of the ensemble neural network (e.g., using a fifth machine learning model). Further, the vehicle device can compare the subsequent output and the stored output to identify timing information (e.g., a start time and/or an end time) associated with the event (e.g., a distracted state of the user of the vehicle) based on comparing the stored output with the subsequent output. The vehicle device may also obtain the output at a frame by frame level. For example each output may correspond to a particular frame.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc.

with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A vehicle device comprising:
   a computer readable storage medium having program instructions embodied therewith; and
   one or more processors configured to execute the program instructions to cause the vehicle device to:
   access sensor data from one or more sensors associated with a vehicle, the sensor data associated with an image of a scene;
   execute an ensemble neural network configured to detect occurrence of an event associated with the vehicle, wherein the event indicates a distracted state of a driver of the vehicle, the ensemble neural network comprising a plurality of models including:

a first model configured to detect one or more hand actions of a user of the vehicle based at least in part on a hand of the user identified using the sensor data, a second model configured to detect a head pose of the user based at least in part on a face of the user identified using the sensor data, a third model configured to detect a gaze of the user based at least in part on the face of the user, and a fourth model configured to predict, based at least in part on the one or more hand actions, the head pose, and the gaze, a probability of the event; and based at least in part on the probability of the event, trigger an event alert indicative of occurrence of the event.

2. A vehicle device comprising:

a computer readable storage medium having program instructions embodied therewith; and one or more processors configured to execute the program instructions to cause the vehicle device to:

access sensor data from one or more sensors associated with a vehicle;

execute an ensemble neural network configured to detect occurrence of an event associated the vehicle, the ensemble neural network comprising a plurality of models including:

a first model configured to detect one or more hand actions of a user of the vehicle based at least in part on a hand of the user identified using the sensor data, a second model configured to detect a head pose of the user based at least in part on a face of the user identified using the sensor data, and a third model configured to predict, based at least in part on the one or more hand actions and the head pose, a probability of the event; and based at least in part on the probability of the event, trigger an event alert indicative of occurrence of the event.

3. The vehicle device of claim 2, wherein a face and hand detection model is configured to detect the face and the hand of the user based at least in part on the sensor data, wherein the face and the hand of the user are identified based at least in part on the output of the face and hand detection model.

4. The vehicle device of claim 2, wherein a face and hand detection model is configured to detect the face of the user by identifying one or more face bounding boxes and detect the hand of the user by identifying one or more hand bounding boxes.

5. The vehicle device of claim 2, wherein the first model comprises a hand action classification model and the second model comprises a head pose classification model.

6. The vehicle device of claim 2, wherein the plurality of models further includes a fourth model configured to detect one or more eye gaze angles based at least in part on the face of the user, wherein the third model is further configured to predict the probability of the event further based at least in part on the one or more eye gaze angles.

7. The vehicle device of claim 2, wherein the ensemble neural network further comprises a plurality of layers, wherein the plurality of models are distributed across the plurality of layers.

8. The vehicle device of claim 7, wherein a first layer of the plurality of layers of the ensemble neural network comprises the first model and the second model and a second layer of the plurality of layers of the ensemble neural network comprises the third model.

9. The vehicle device of claim 2, wherein the sensor data comprises at least one of camera data, accelerometer data, audio data, or location data.

10. The vehicle device of claim 2, wherein the one or more processors are configured to execute the program instructions to:

store the event alert to generate a stored event alert;

trigger an additional event alert indicative of occurrence of the event;

compare the stored event alert with the additional event alert; and identify timing information associated with the event based at least in part on comparing the stored event alert with the additional event alert.

11. The vehicle device of claim 2, wherein, to trigger the event alert, the one or more processors are configured to execute the program instructions to further cause the vehicle device to trigger the event alert at a frame by frame level.

12. The vehicle device of claim 2, wherein the ensemble neural network comprises a frame classifier pipeline and a sequence detector pipeline.

13. The vehicle device of claim 2, wherein the event indicates a distracted state of the user.

14. The vehicle device of claim 2, wherein the one or more processors are configured to execute the program instructions to further cause the vehicle device to train the ensemble neural network.

15. The vehicle device of claim 2, wherein the second model is configured to detect the head pose based at least in part on detection of one or more of a yaw, a pitch, or a roll angle.

16. The vehicle device of claim 2, wherein the one or more hand actions comprise at least one of a neutral hand action, a hand interacting with a phone hand action, or a hand interacting with food hand action.

17. The vehicle device of claim 2, wherein the third model is configured to predict the probability of the event based at least in part on an output of the first model and an output of the second model.

18. The vehicle device of claim 2, wherein the plurality of models further includes a fourth model configured to detect a start time and an end time of the event based at least in part on the probability of the event.

19. The vehicle device of claim 2, wherein the sensor data comprises streaming sensor data.

20. A computer-implemented method comprising:

accessing sensor data from one or more sensors associated with a vehicle;

executing an ensemble neural network configured to detect occurrence of an event associated with the vehicle, the ensemble neural network comprising a plurality of models including:

a first model configured to detect one or more hand actions of a user of the vehicle based at least in part on a hand of the user identified using the sensor data, a second model configured to detect a head pose of the user based at least in part on a face of the user identified using the sensor data, and a third model configured to predict, based at least in part on the one or more hand actions and the head pose, a probability of the event; and based at least in part on the probability of the event, triggering an event alert indicative of occurrence of the event.

* * * * *